(12) United States Patent
Iwashita

(10) Patent No.: US 11,463,451 B2
(45) Date of Patent: Oct. 4, 2022

(54) CONTROL APPARATUS, ACCESS CONTROL METHOD, AND NON-TRANSITORY RECORDING MEDIUM STORING A PLURALITY OF INSTRUCTIONS

(71) Applicant: Ricoh Company, Ltd., Tokyo (JP)

(72) Inventor: Shinya Iwashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/658,617

(22) Filed: Oct. 21, 2019

(65) Prior Publication Data
US 2020/0169569 A1    May 28, 2020

(30) Foreign Application Priority Data
Nov. 27, 2018    (JP) .............................. JP2018-221580

(51) Int. Cl.
*G06F 21/62*    (2013.01)
*H04L 9/40*    (2022.01)
*H04L 61/4511*    (2022.01)

(52) U.S. Cl.
CPC ........ *H04L 63/108* (2013.01); *H04L 61/4511* (2022.05); *G06F 21/6263* (2013.01)

(58) Field of Classification Search
None
See application file for complete search history.

(56) References Cited

U.S. PATENT DOCUMENTS

| 2009/0019523 | A1  | 1/2009 | Takahashi et al. |
| 2009/0241167 | A1* | 9/2009 | Moore ............... H04L 61/1511 726/1 |

(Continued)

FOREIGN PATENT DOCUMENTS

| JP | 2004-304235 A | 10/2004 |
| JP | 2006-004189 A | 1/2006 |

(Continued)

OTHER PUBLICATIONS

Malav et al., Network Security Using IDS, IPS & Honeypot, 2016, International Journal of Recent Research in Mathematics Computer Science and Information Technology, vol. 2, Issue 2, pp. 27-30 (Year: 2016).*

(Continued)

*Primary Examiner* — Luu T Pham
*Assistant Examiner* — Edward X Long
(74) *Attorney, Agent, or Firm* — Harness, Dickey & Pierce, P.L.C.

(57) ABSTRACT

A control apparatus, an access control method, and non-transitory recording medium storing a plurality of instructions. The control apparatus transmits to an administrator terminal, screen data for accepting input of requested settings including host information for identifying the access target server and condition information indicating conditions for controlling access to the access target server, receives the requested settings from the administrator terminal, stores access control settings associating the host information and the condition information based on the received requested settings, receives an access request to a particular access target server from the communication terminal, and transmits a response to the access request to the communication terminal based on a scheduled access time indicated by the received access request and a condition indicated by condition information associated with host information for identifying the particular access target server.

12 Claims, 25 Drawing Sheets

(56) References Cited

U.S. PATENT DOCUMENTS

| | | | | |
|---|---|---|---|---|
| 2010/0054158 A1* | 3/2010 | Mathai | ................... | H04W 76/15 |
| | | | | 370/259 |
| 2012/0294236 A1* | 11/2012 | Watfa | .................... | H04W 76/10 |
| | | | | 370/328 |
| 2017/0026382 A1* | 1/2017 | Trigger | ............... | H04L 63/0227 |
| 2020/0037335 A1* | 1/2020 | Killadi | .................. | H04W 16/14 |

FOREIGN PATENT DOCUMENTS

| | | |
|---|---|---|
| JP | 2007-122692 A | 5/2007 |
| JP | 2008-312016 A | 12/2008 |
| JP | 2012-108947 A | 6/2012 |
| JP | 2013-098880 A | 5/2013 |
| JP | 2017-085273 A | 5/2017 |

OTHER PUBLICATIONS

Kang et al., MoveWithMe: Location Privacy Preservation for Smartphone Users, 2020, IEEE Transactions on Information Forensics and Security, vol. 15, 711-723 3 (Year: 2020).*

Office Action dated Jun. 7, 2022 issued in corresponding Japanese Patent Application No. 2018-221580.

* cited by examiner

FIG. 7

| No. | RESTRICTED URL | RESTRICTED PERIOD |
|---|---|---|
| 1 | xxx.example.com | 10:00 – 12:00 ; DAILY |
| 2 | yyy.example.com | 13:00 – 15:00 ; DAILY |
| 3 | zzz.example.com | 16:00 – 17:30 ; MONDAY |
| ... | ... | ... |

150a

| No. | RESTRICTED URL | PERMITTED PERIOD |
|---|---|---|
| 1 | xxx.example.com | 0:00 – 10:00, 12:00–0:00 ; DAILY |
| 2 | yyy.example.com | 0:00 – 13:00, 15:00–0:00 ; DAILY |
| 3 | zzz.example.com | 14:00 – 16:00 ; MONDAY |
| ... | ... | ... |

| No. | RESTRICTED URL | RESTRICTED PERIOD |
|---|---|---|
| 1 | xxx.example.com | 10:00 − 12:00 ; MONDAY |
| 2 | yyy.example.com | 13:00 − 14:30 ; WEDNESDAY |
| 3 | zzz.example.com | 9:00 − 17:00 ; FRIDAY |
| ... | ... | ... |

| No. | SCHEDULE | SCHEDULED PERIOD |
|---|---|---|
| 1 | PROGRAMMING EXERCISES | 10:00 − 12:00 ; MONDAY |
| 2 | BASIC GERMAN | 13:00 − 14:30 ; WEDNESDAY |
| 3 | PATENT EDUCATION | 9:00 − 17:00 ; FRIDAY |
| ... | ... | ... |

| No. | RESTRICTED URL | RESTRICTED PERIOD | NETWORK SEGMENT |
|---|---|---|---|
| 1 | xxx.example.com | 10:00 – 12:00 ; DAILY | 192.168.30.0/24 |
| 2 | yyy.example.com | 13:00 – 15:00 ; DAILY | 192.168.50.0/24 |
| 3 | zzz.example.com | 16:00 – 17:30 ; MONDAY | 192.168.70.0/24 |
| ... | ... | ... | ... |

| No. | ROOM | NETWORK SEGMENT |
|---|---|---|
| 1 | LECTURE ROOM A | 192.168.30.0/24 |
| 2 | STUDY ROOM | 192.168.50.0/24 |
| 3 | LECTURE ROOM B | 192.168.70.0/24 |
| ... | ... | ... |

CONTROL APPARATUS, ACCESS CONTROL METHOD, AND NON-TRANSITORY RECORDING MEDIUM STORING A PLURALITY OF INSTRUCTIONS

CROSS-REFERENCE TO RELATED APPLICATIONS

This patent application is based on and claims priority pursuant to 35 U.S.C. § 119(a) to Japanese Patent Application No. 2018-221580, filed on Nov. 27, 2018 in the Japan Patent Office, the entire disclosure of which is hereby incorporated by reference herein.

BACKGROUND

Technical Field

The present disclosure relates to a control apparatus, an access control method, and non-transitory recording medium storing a plurality of instructions.

Background Art

In communication using the internet, a "domain name" is used as a method for designating a communications partner. Further, in the communication protocol, an internet protocol (IP) address is used to designate a communications partner. The IP address is difficult for the user to recognize, and a plurality of IP addresses may be used for one communication partner (web service, etc.) for the purpose of redundancy. For this reason, a "domain name system (DNS)" that associates a domain name used by a user with an IP address used by a communication protocol is widely used.

SUMMARY

Embodiments of the present disclosure include a control apparatus, an access control method, and non-transitory recording medium storing a plurality of instructions. The control apparatus transmits to an administrator terminal, screen data for accepting input of requested settings including host information for identifying the access target server and condition information indicating conditions for controlling access to the access target server, receives the requested settings from the administrator terminal, stores access control settings associating the host information and the condition information based on the received requested settings, receives an access request to a particular access target server from the communication terminal, and transmits a response to the access request to the communication terminal based on a scheduled access time indicated by the received access request and a condition indicated by condition information associated with host information for identifying the particular access target server.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7 is a diagram illustrating an example of an access control management table according to the first embodiment of the present disclosure;

FIG. 17 is a diagram illustrating an example of an access control management table according to the second embodiment of the present disclosure;

FIG. 18 is a diagram illustrating an example of a schedule management table according to the second embodiment of the present disclosure;

FIG. 25 is a diagram illustrating an example of an access control management table according to the third embodiment of the present disclosure;

FIG. 26 is a diagram illustrating an example of a network management table according to the third embodiment of the present disclosure;

Figure 1:
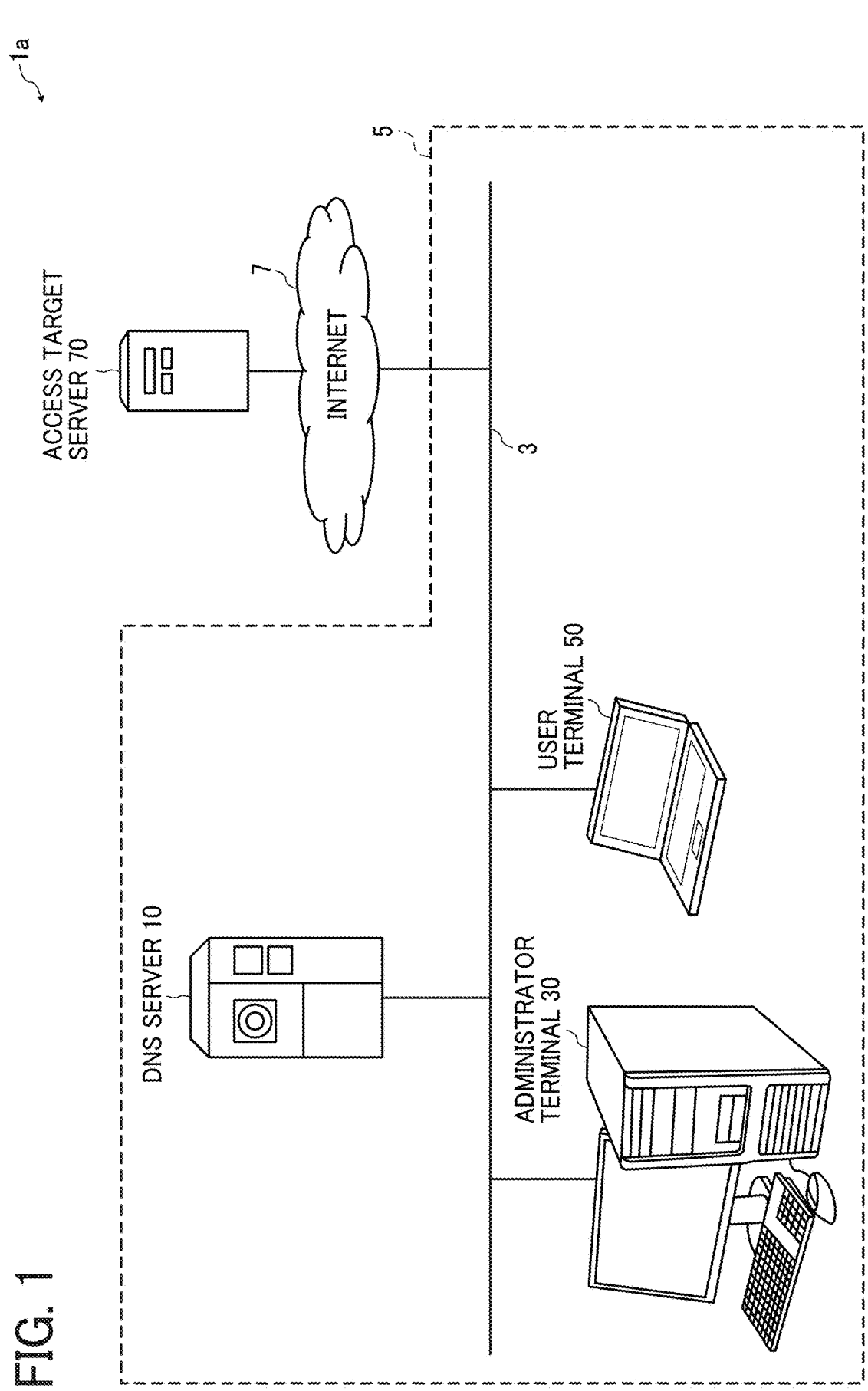
FIG. 1 is a diagram illustrating an example of a system configuration of a network system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described with reference to the drawings. In the description of the drawings, the same elements are denoted by the same reference numbers, and redundant description is omitted.

First Embodiment

System Configuration

FIG. 1 is a diagram illustrating an example of a system configuration of a network system according to a first embodiment of the present disclosure. The network system 1a illustrated in FIG. 1 facilitates an administrator to flexibly switch control rules for controlling access from a communication terminal to an access target server by access control using a domain name system (DNS) server 10. The network system 1a includes the DNS server 10, an administrator terminal 30, the user terminal 50, and the access target server 70. The DNS server 10, the administrator terminal 30, and the user terminal 50 are respectively present in a local network 5 that is an internal network of an organization or a facility. The local network 5 is a network constructed in a network environment such as an office, a conference room, a warehouse, a factory, or a production line. The local network 5 is a communication network 3 such as an in-house local area network (LAN) that does not pass through the internet. The DNS server 10, the administrator terminal 30, and the user terminal 50 are communicably connected within the local network 5 through the communication network 3 such as the LAN. In addition, the DNS server 10, the administrator terminal 30, and the user terminal 50 can access (connect to) the access target server 70 through the internet 7.

The DNS server 10 is a name resolution server connected to the local network 5. The DNS server 10 receives an inquiry about a domain name from the user terminal 50 connected to the local network 5 and converts the "domain name" into an "internet protocol (IP) address" (name resolution). The "domain name" is an example of host information for identifying the access target server 70. The "IP address" is an example of destination information indicating a destination of the access target server 70. FIG. 1 illustrates a configuration in which the DNS server 10 is located in the local network 5. Alternatively, the DNS server 10 may exist in a network managed by an internet service provider (ISP) or may be configured to be able to communicate with the user terminal 50 in the local network 5 through the internet 7. The DNS server 10 is an example of a control apparatus.

The administrator terminal 30 is a terminal used by an administrator of the local network 5. The administrator terminal 30 sets a control rule for controlling access from the user terminal 50 in the local network 5 to the access target server 70 through the internet 7. The user terminal 50 is a communication terminal connected to the local network 5.

The administrator terminal 30 and the user terminal 50 are terminals such as a desktop personal computer (PC) or a notebook PC. Alternatively, the administrator terminal 30 and the user terminal 50 may be a mobile phone, a smartphone, a tablet terminal, a game machine, a personal digital assistant (PDA), a digital camera, a wearable PC, or the like.

The access target server 70 is a web server accessible through the internet 7 from the user terminal 50 in the local network 5. The access target server 70 can be accessed by designating a uniform resource locator (URL) by the user terminal 50. The access target server 70 is typically a server that can be reached through the internet 7 but may be a server in the local network 5. The network system 1a may have a plurality of access target servers 70.

Overview

Figure 2:
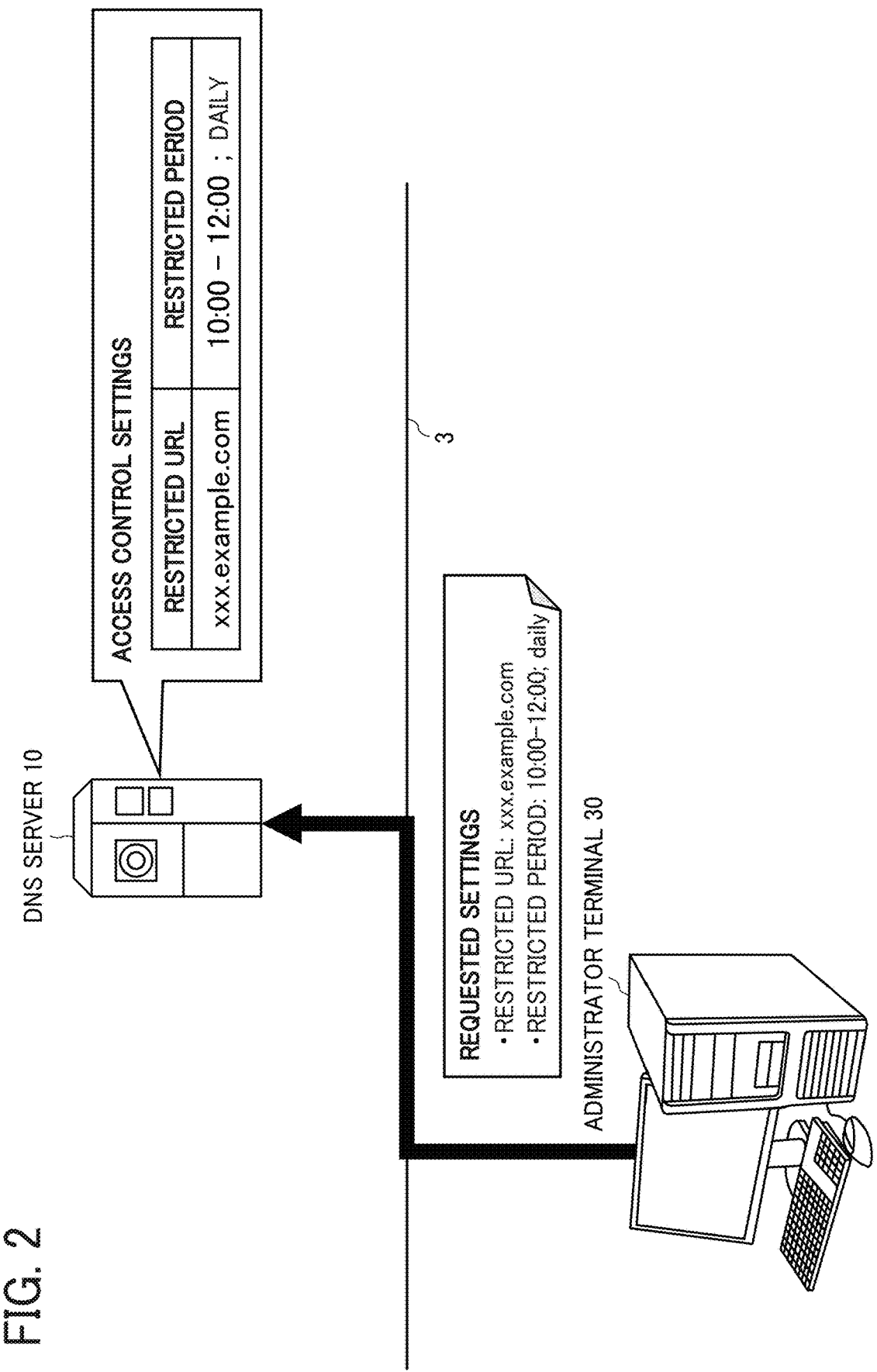
FIG. 2 is a schematic diagram illustrating an example of access control setting process executed by the network system according to the first embodiment of the present disclosure.
Figure 3:
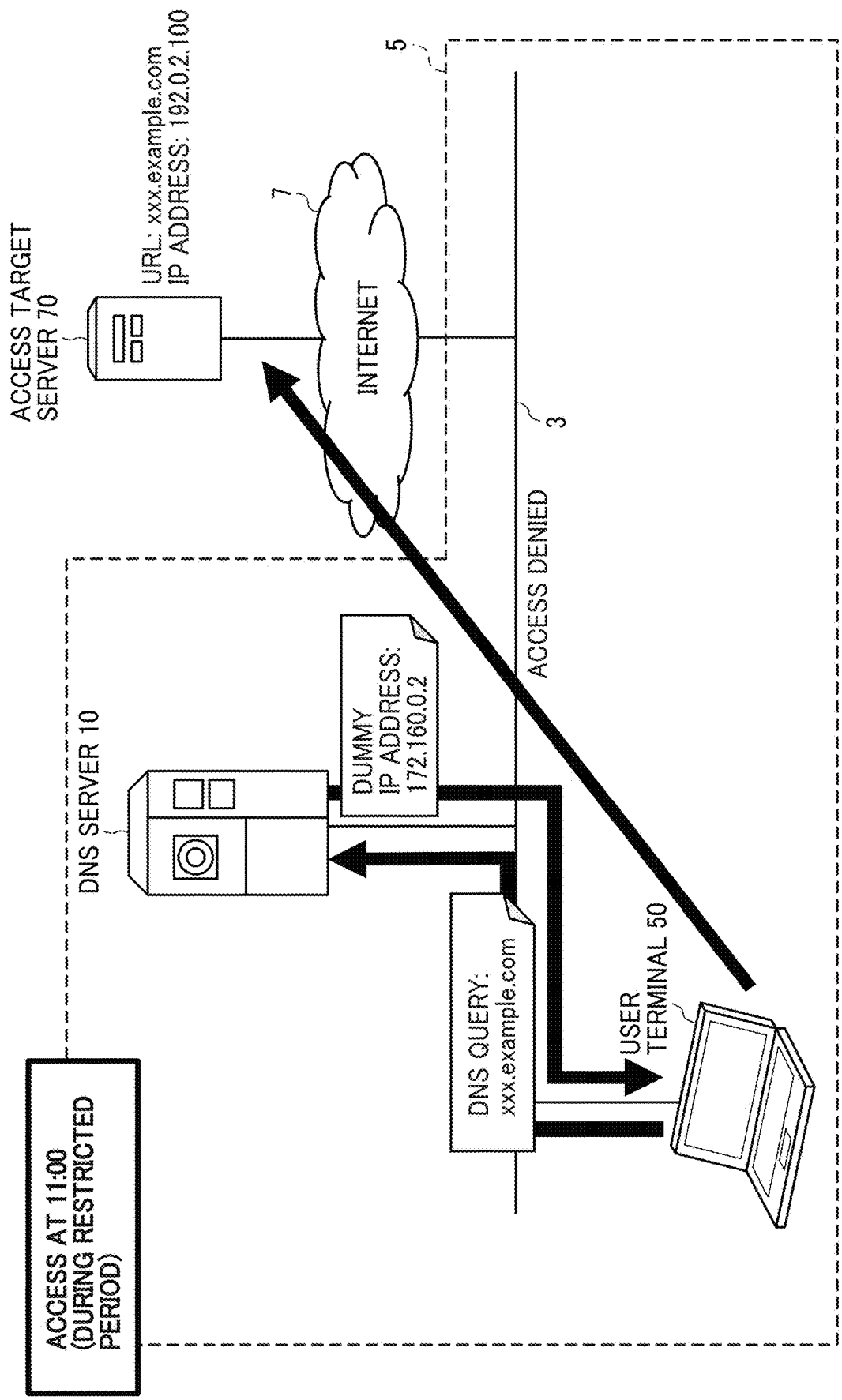
FIG. 3 is a schematic diagram illustrating an example of an access process from a user terminal to an access target server in the network system during a restricted period according to the first embodiment of the present disclosure.
Figure 4:
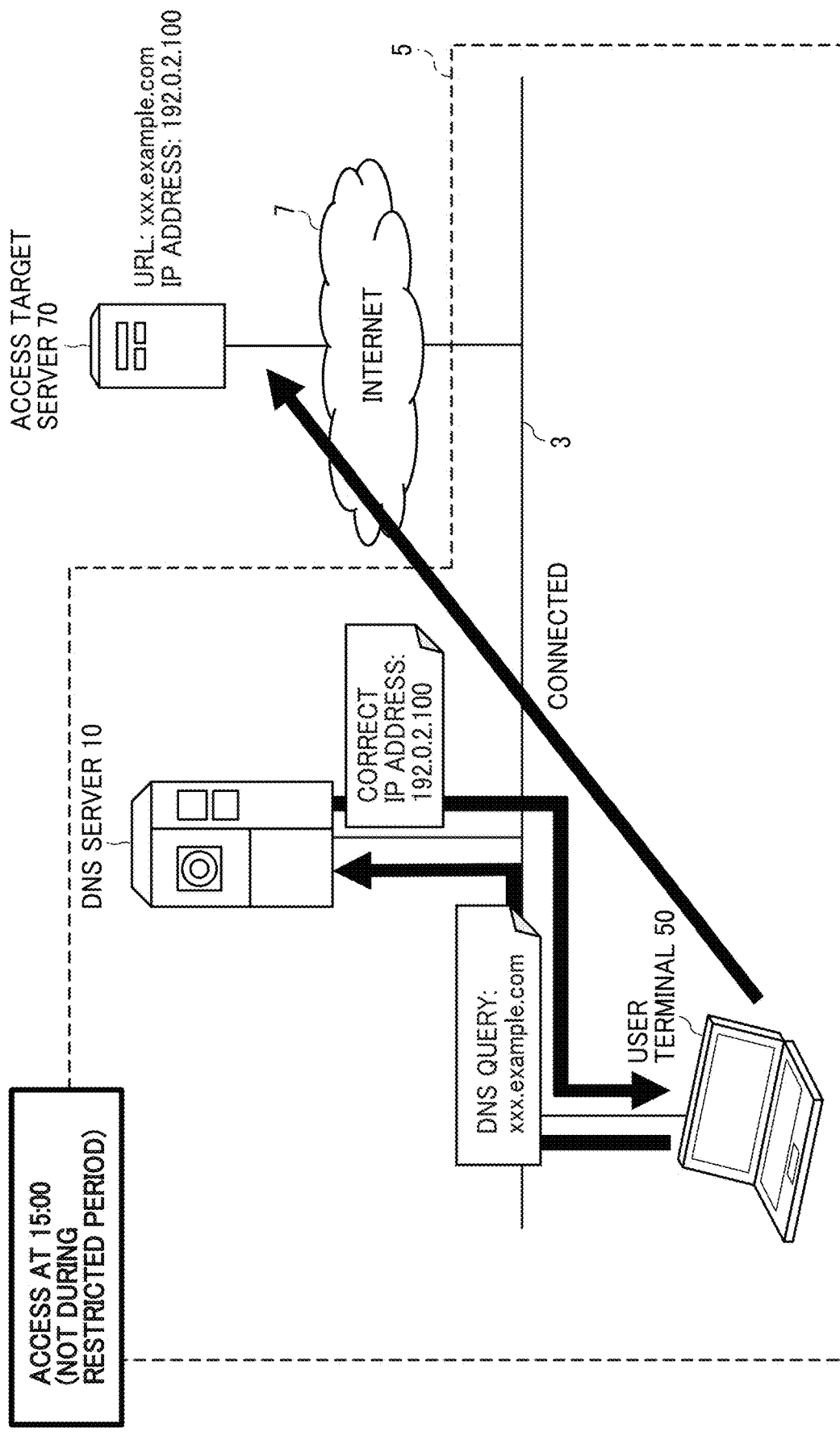
FIG. 4 is a schematic diagram illustrating an example of an access process from the user terminal to the access target server not during a restricted period in the network system according to the first embodiment of the present disclosure.

An outline of the configuration of the network system according to the first embodiment is described below. FIGS. 2 to 4 simply illustrate the outline of the network system according to the first embodiment, and details of functions and the like implemented by the network system 1a are described below with reference to drawings.

FIG. 2 illustrates a process for restricting access to the access target server 70. FIG. 2 is a schematic diagram illustrating an example of an access control setting process executed by the network system according to the first embodiment of the present disclosure. The network system 1a is a system that is used, for example, at an educational site such as a university or a training institution and performs access control of the user terminal 50 used by a student only during a lecture. The network system 1a limits the web services that can be accessed without disturbing the student or prevent the user terminal 50 from becoming inoperable due to forcibly downloading or installing the update with the access control of the user terminal 50. The usage of the network system 1a is not limited to the above examples.

In the network system 1a illustrated in FIG. 2, the administrator terminal 30 transmits to the DNS server 10 the URL (restricted URL) of the access target server 70 for which access from the user terminal 50 is to be restricted (prohibited), and requested settings including a restricted period that is a period for which the access is to be restricted. The administrator who uses the administrator terminal 30 executes the access control setting process using the input screen provided from the DNS server 10. The restricted URL is a name resolution record provided by the DNS server 10 and is an example of host information for identifying the access target server 70. The restricted period is an example of condition information indicating a condition for controlling access to the access target server 70.

The DNS server 10 stores the requested settings, such as the restricted period, transmitted from the administrator terminal 30 as a part of access control settings in an access control management table 150a described below. As a result, the DNS server 10 can set access restrictions, for an access target server 70 (host) defined by a period such as time of day or day of the week based on the requested settings transmitted from the administrator terminal 30.

A process in which the user terminal 50 accesses the access target server 70 is described with reference to FIG. 3 and FIG. 4. FIG. 3 is a schematic diagram illustrating an example of an access process from a user terminal to an access target server in the network system during a restricted period according to the first embodiment of the present disclosure. FIG. 3 illustrates a process in which the user terminal 50 tries to access the access target server 70 identified by the restricted URL within the restricted period set in the process illustrated in FIG. 2.

The user terminal 50 performs name resolution using the DNS server 10 when attempting to access the access target server 70. Specifically, the user terminal 50 transmits a URL (xxx.example.com) of the access target server 70 to the DNS server 10 as a DNS query. Since the access time from the user terminal 50 (the time when the DNS query including the restricted URL is received) is within the period indicated by the restricted period included in the access control settings illustrated in FIG. 2, the DNS server 10 transmits an IP address (dummy IP address) different from the IP address of the access target server 70 to the user terminal 50. In an example illustrated in FIG. 3, the DNS server 10 transmits to the user terminal 50 an IP address "172.16.0.2" different from the IP address "192.0.2.100" of the access target server 70 (URL; "xxx.example.com"). The user terminal 50 receives the dummy IP address, but cannot obtain the IP address of the access target server 70. The access (connection) to the access target server 70 from the user terminal 50 through the internet 7 is denied. The dummy IP address is an example of second destination information.

Here, the dummy IP address may be an address that cannot be reached from the user or may be an address of the DNS server 10 itself. When the dummy IP address is the address of the DNS server 10 itself, the user terminal 50 transmits a request such as HyperText Transfer Protocol (HTTP) to the DNS server 10. In response to the request, the DNS server 10 transmits access prohibition screen data indicating that access is restricted (prohibited) to the user terminal 50. The user terminal 50 displays the received access prohibition screen data as an access prohibition screen 600 (illustrated in FIG. 12) on the display 206a, thereby notifying the user that the access is restricted (prohibited).

As a result, the DNS server 10 can restrict the user terminal 50 from communicating through the internet 7 for a time by transmitting an IP address different from the requested IP address of the access target server 70 to the user terminal 50, when a DNS query including the restricted URL is received during the restricted period included in the access control settings.

A process in which the user terminal 50 tries to access the access target server 70 identified by the restricted URL outside the period indicated by the restricted period set in the process illustrated in FIG. 2 is described below. FIG. 4 is a schematic diagram illustrating an example of an access process from the user terminal to the access target server outside the restricted period in the network system according to the first embodiment of the present disclosure.

As in FIG. 3, the user terminal 50 performs name resolution using the DNS server 10 when attempting to access an access target server 70. Specifically, the user terminal 50 transmits a URL (xxx.example.com) of the access target server 70 to the DNS server 10 as a DNS query. Since the access time from the user terminal 50 (the time when the DNS query including the restricted URL is received) is outside the period indicated by the restricted period included in the access control settings illustrated in FIG. 2, the DNS server 10 transmits the correct IP address of the access target server 70 to the user terminal 50. In the example illustrated in FIG. 4, the DNS server 10 transmits the IP address "192.0.2.100" of the access target server 70 (URL; "xxx.example.com") to the user terminal 50. Since the user terminal 50 can receive the IP address of the access target server 70, the user terminal 50 can access (connect to) the access target server 70 through the internet 7 using the received IP address. The IP address of the access target server 70 is an example of first destination information.

As described above, in the network system 1a, the DNS server 10 provides screen data for setting access control settings to the administrator terminal 30. The administrator terminal 30 inputs host information such as the URL of the access target server 70 for which access is to be restricted (prohibited) and restricted period (an example of condition information) indicating a period for which the access is to be restricted. The DNS server 10 receives from the administrator terminal 30, the requested settings including host information and restricted period input by the administrator terminal 30 and registers the received settings as access control settings. Then, the DNS server 10 responds to the name resolution request from the user terminal 50 based on the registered access control settings.

As a result, the network system 1a adds or changes access control settings at any time using the administrator terminal 30 when it is desired to switch the control rule using the host information and the restricted period such as time of day or day of the week. The administrator's workload can be reduced without the administrator having frequently to perform setting change operations on the DNS server 10. Further, the network system 1a can control communication of the user terminal 50 through the internet based on the access control settings set in the DNS server 10.

Hardware Configuration

A hardware configuration of each apparatus according to the first embodiment is described with reference to FIG. 5. The hardware configuration of each apparatus, such as the DNS server 10, administrator terminal 30, user terminal 50, and access target server 70, according to the first embodiment has a general computer configuration. Here, a hardware configuration example of the general computer is described.

Figure 5:
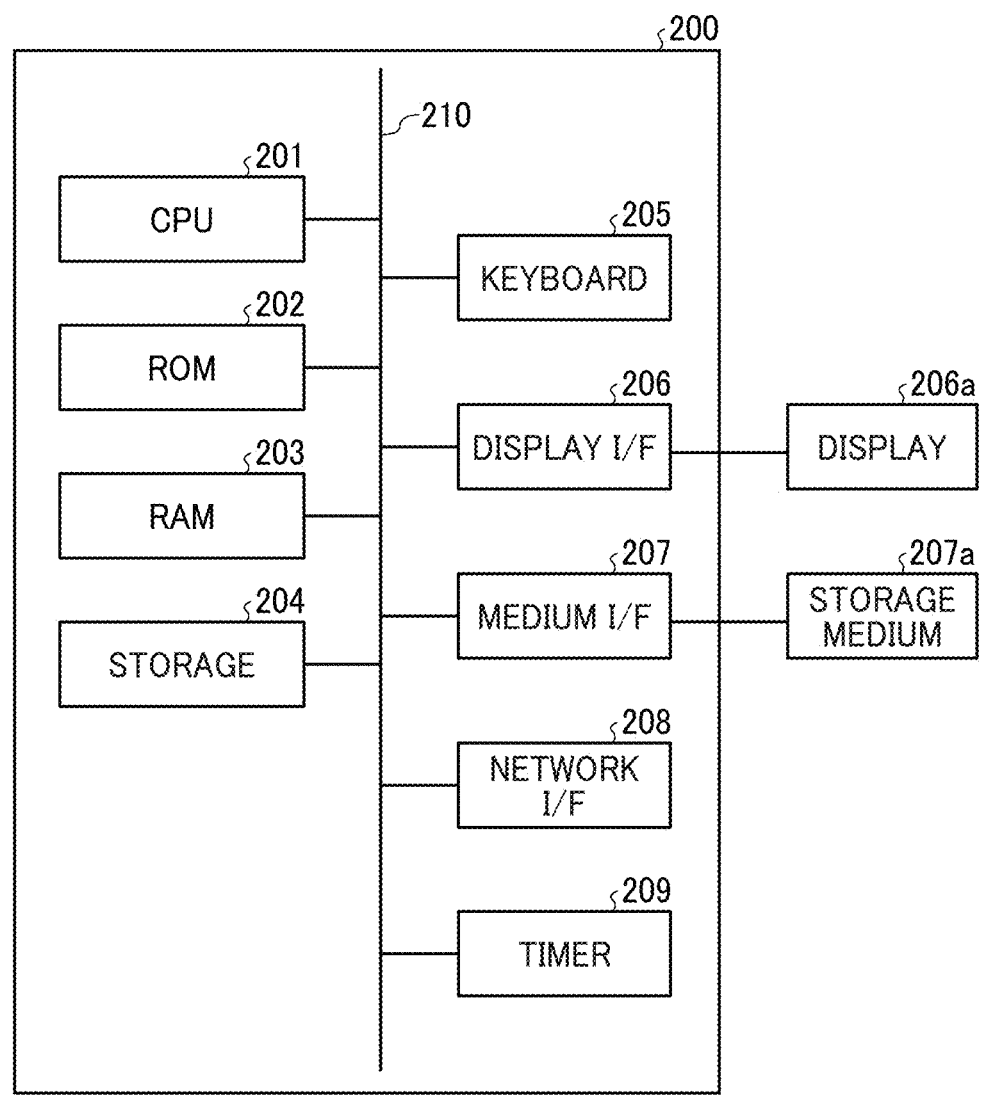
FIG. 5 is a block diagram illustrating an example of a hardware configuration of a computer according to the first embodiment of the present disclosure.

FIG. 5 is a diagram illustrating an example of the hardware configuration of the computer according to the first embodiment of the present disclosure. The computer 200 includes a central processing unit (CPU) 201, a read only memory (ROM) 202, a random access memory (RAM) 203, a storage f204, a keyboard 205, a display interface (I/F) 206, and a medium I/F 207, a network I/F 208, a timer 209, and a bus line 210.

The CPU 201 is an arithmetic device that implements each function of the computer 200 by reading the program and data according to the present disclosure stored in the ROM 202, the storage 204, and the like onto the RAM 203 and executing the processing. For example, the DNS server 10 implements the access control method according to the present disclosure by executing the program according to the present disclosure.

The ROM 202 is a nonvolatile memory that can retain programs and data even when the power is turned off. The ROM 202 is configured by, for example, a flash ROM. The ROM 202 is installed with applications such as software development kit (SDK) and application programming interface (API), and functions of the computer 200, network connection, and the like can be implemented using the installed applications.

The RAM 203 is a volatile memory used as a work area for the CPU 201. The storage 204 is a storage device such as a hard disk drive (HDD) or a solid state drive (SSD). The storage 204 stores, for example, an operating system (OS), application programs, various data, and the like.

The keyboard 205 is an input device having a plurality of keys for inputting characters, numerical values, various instructions, and the like. The input device may be a mouse, a touch panel, or a voice input device, for example. A display I/F 206 controls display of various information such as a cursor, menu, screen, character, or image on a display 206a such as a liquid crystal display (LCD). The display 206a may be a touch panel display provided with an input device.

The medium I/F 207 controls reading or writing (storage) of data with respect to a storage medium 207a such as a universal serial bus (USB) memory, a memory card, an optical disk, or a flash memory.

The network I/F 208 is an interface for connecting the computer 200 to a network and transmitting or receiving data to and from another computer or an electronic device. The network I/F 208 is a communication interface such as a wired or wireless LAN. The network I/F 208 may include communication interface for 3rd Generation (3G), Long Term Evolution (LTE), 4th Generation (4G), 5th Generation (5G), Zigbee (registered trademark), Bluetooth (registered trademark) Low Energy (BLE), and millimeter wave wireless communication. The timer 209 is a measuring device having a time measuring function. The timer 209 may be a software timer implemented by a computer.

The bus line 210 is commonly connected to the above-described components, and transmits an address signal, a data signal, various control signals, and the like. The CPU 201, ROM 202, RAM 203, storage 204, keyboard 205, display I/F 206, medium I/F 207, network I/F 208, and timer 209 are connected to each other through a bus line 210.

In the hardware configuration of each device according to the first embodiment, components may be added or deleted as necessary. For example, the DNS server 10 and the access target server 70 may be configured not to include input device such as the keyboard 205 and the display 206a. Further, the hardware configuration of each device illustrated in FIG. 5 may have the same configuration in each embodiment.

Functional Configuration

Figure 6:
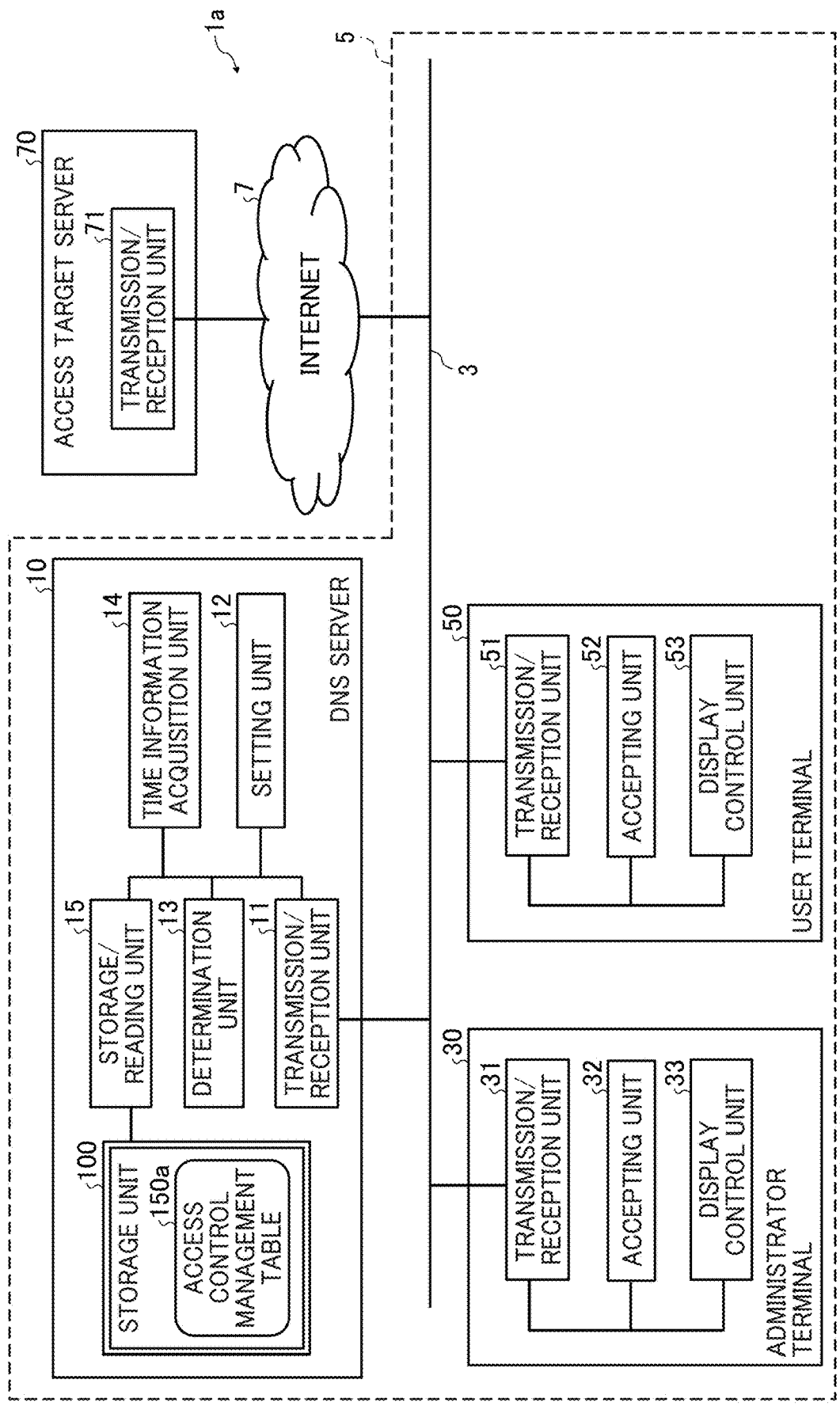
FIG. 6 is a block diagram illustrating an example of a functional configuration of the network system according to the first embodiment of the present disclosure.

The functional configuration of the network system according to the first embodiment is described with reference to FIG. 6. FIG. 6 is a diagram illustrating an example of a functional configuration of the network system according to the first embodiment of the present disclosure.

Functional Configuration of DNS Server

The functional configuration of the DNS server 10 is described below. Functions implemented by the DNS server 10 illustrated in FIG. 6 include a transmission/reception unit 11, a setting unit 12, a determination unit 13, a time information acquisition unit 14, a storage/reading unit 15, and a storage unit 100.

The transmission/reception unit 11 has a function of transmitting and receiving various data to and from an external device. The transmission/reception unit 11 transmits and receives various data (information) between the administrator terminal 30 and the user terminal 50 which are connected to the local network 5, for example. The transmission/reception unit 11 transmits, for example, requested settings input screen data, to input requested settings for access control settings, to the administrator terminal 30. Here, the requested settings include host information for identifying the access target server 70 and restricted period information indicating a period for restricting access (connection) to the access target server 70 identified by the host information. In addition, the transmission/reception unit 11 receives from the administrator terminal 30, the requested settings received by the administrator terminal 30. Furthermore, the transmission/reception unit 11 receives an access request to the access target server 70 from the user terminal 50. The access request includes host information for identifying an access target server 70. Further, the transmission/reception unit 11 transmits an IP address which is a name resolution provided by the DNS server 10 to the user terminal 50 based on host information included in the received access request and an access control management table 150a described below. The transmission/reception unit 11 is implemented by, for example, the network I/F 208 and a program executed by the CPU 201 illustrated in FIG. 5.

The setting unit 12 sets access control settings for controlling access (connection) to the access target server 70 from the user terminal 50. The setting unit 12 sets access control settings in an access control management table 150a described below using the requested settings received by the transmission/reception unit 11. The setting unit 12 is implemented by, for example, a program executed by the CPU 201 illustrated in FIG. 5.

The determination unit 13 determines whether access (connection) to the access target server 70 that is the access request destination is permissible based on an access request from the user terminal 50. The determination unit 13 is implemented by, for example, a program executed by the CPU 201 illustrated in FIG. 5.

The time information acquisition unit 14 acquires time information indicating the current time using the timer 209. The time information acquisition unit 14 is implemented by, for example, a program executed by the CPU 201 illustrated in FIG. 5.

The storage/reading unit 15 stores various data in the storage unit 100 and reads various data from the storage unit 100. The storage/reading unit 15 is implemented by, for example, a program executed by the CPU 201 illustrated in FIG. 5. The storage unit 100 is implemented by the ROM 202, the storage 204, the storage medium 207a, or the like illustrated in FIG. 5. The storage unit 100 stores an access control management table 150a.

Access Control Management Table

An access control management table 150a stored in the storage unit 100 is described below. FIG. 7 is a diagram illustrating an example of the access control management table according to the first embodiment of the present disclosure; The access control management table 150a illustrated in FIG. 7 stores access control settings which is a control rule for controlling access from the user terminal 50 to the access target server. The access control management table 150a stores a restricted URL for identifying an access target server 70 that restricts (prohibits) access from the user terminal 50 and a restricted period during which access to the access target server 70 from the user terminal 50 is restricted (prohibited), in association with each other.

The restricted URL is a name resolution record for identifying an access target server 70. The restricted URL is an example of host information for identifying the access target server 70. The restricted period indicates a period during which access to the associated restricted URL is restricted. The restricted period indicates a time slot, day of the week, date, frequency, or a period such as a weekday, a holiday, or a high day, in which access to the access target server 70 from the user terminal 50 is restricted (prohibited). The restricted period is an example of condition information indicating a condition for restricting access to the access target server 70. For example, in the access control management table 150a, the restricted period for restricting access to the restricted URL "xxx.example.com" is "10:00-12:00 daily", the restricted period for restricting access to the restricted URL "yyy.example.com" is "13:00-15:00 daily", and the restricted period for restricting access to the restricted URL "zzz.example.com" is "16:00-17:30 Monday".

In the access control management table 150a, a plurality of different restricted periods may be set for the same restricted URL. In the access control management table 150c, a plurality of different restricted URLs may be set in the same restricted period. Further, in the access control management table 150a, access control settings may be set for each user terminal 50 or each user.

Functional Configuration of Administrator Terminal

The functional configuration of the administrator terminal 30 is described below. The administrator terminal 30 illustrated in FIG. 6 includes a transmission/reception unit 31, an accepting unit 32, and a display control unit 33.

The transmission/reception unit 31 transmits and receives various data to and from an external device through a network. For example, the transmission/reception unit 31 receives screen data indicating an input screen for requested settings from the DNS server 10. Further, the transmission/reception unit 31 transmits the requested settings accepted by the accepting unit 32 to the DNS server 10. The transmission/reception unit 31 is implemented by, for example, a program executed by the CPU 201 illustrated in FIG. 5.

The accepting unit 32 accepts user input to an input device such as the keyboard 205 illustrated in FIG. 5. The accepting unit 32 accepts input of requested settings to the access control settings screen 400a displayed on the display 206a, for example. The accepting unit 32 is implemented by, for example, the keyboard 205 and a program executed by the CPU 201 illustrated in FIG. 5. The display control unit 33 displays various screen information on the display 206a illustrated in FIG. 5. For example, the display control unit 33 causes the display 206a to display an access control settings screen 400a (illustrated in FIG. 9), which is described below, using the screen data received by the transmission/reception unit 31. The display control unit 33 is implemented by, for example, a program executed by the CPU 201 illustrated in FIG. 5. The display 206a of the administrator terminal 30 is an example of a display unit.

Functional Configuration of User Terminal

Hereinafter, a functional configuration of the user terminal 50 is described. The user terminal 50 illustrated in FIG. 6 includes a transmission/reception unit 51, an accepting unit 52 and a display control unit 53.

The transmission/reception unit 51 transmits and receives various data to and from an external device through a network. For example, the transmission/reception unit 51 transmits an access request (name resolution request) including host information for identifying the access target server 70 to the DNS server 10. Further, the transmission/reception unit 51 receives an IP address that is a result of name resolution by the DNS server 10. Further, the transmission/reception unit 51 accesses (connects to) the access target server 70 through the internet 7. The transmission/reception unit 51 is implemented by, for example, the network I/F 208 and a program executed by the CPU 201 illustrated in FIG. 5.

The accepting unit 52 accepts a user input to an input device such as the keyboard 205 illustrated in FIG. 5. The accepting unit 52 is implemented by, for example, the keyboard 205 and a program executed by the CPU 201 illustrated in FIG. 5. The display control unit 53 displays various screen information on the display 206a illustrated in FIG. 5. The display control unit 53 is implemented by, for example, a program executed by the CPU 201 illustrated in FIG. 5.

Functional Configuration of Access Target Server

Hereinafter, a functional configuration of the access target server 70 is described. The access target server 70 includes a transmission/reception unit 71 illustrated in FIG. 6. The transmission/reception unit 71 transmits and receives various data to and from an external device through the internet 7. The transmission/reception unit 71 communicates with the user terminal 50 through the internet 7. The transmission/reception unit 71 is implemented by, for example, the network I/F 208 and a program executed by the CPU 201 illustrated in FIG. 5.

Processing or Operation in the First Embodiment Access Control Setting Process

Figure 8:
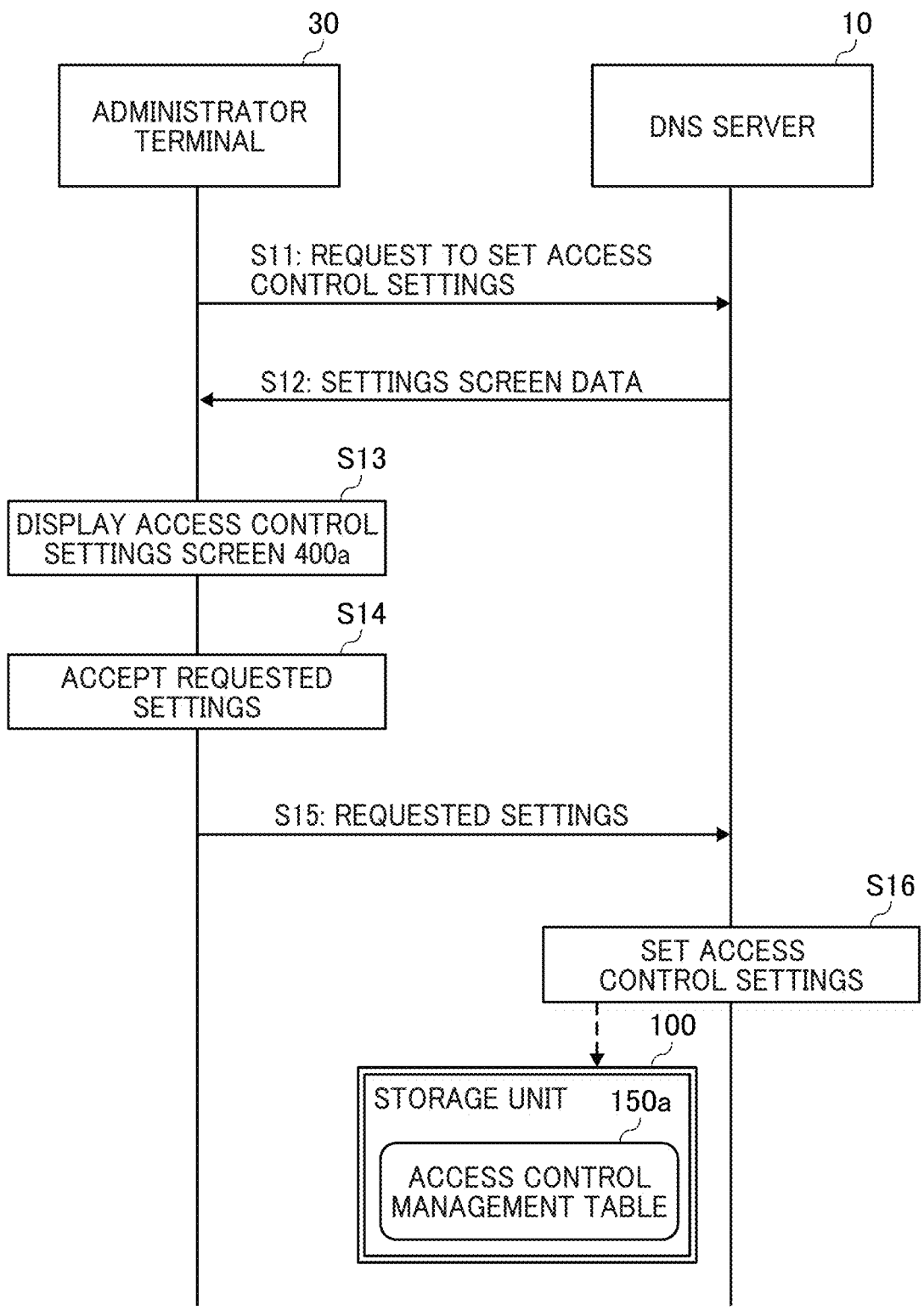
FIG. 8 is a sequence diagram illustrating an example of access control setting process according to the first embodiment of the present disclosure.

Hereinafter, processing or operation of the network system according to the first embodiment is described. First, a process in which the administrator of the local network 5 sets an access restriction to the access target server 70 from the user terminal 50 is described with reference to FIGS. 8 and 9. FIG. 8 is a sequence diagram illustrating an example of access control setting process according to the first embodiment of the present disclosure.

In step S11, the transmission/reception unit 31 of the administrator terminal 30 issues a request to set access control settings to the DNS server 10 based on a user input operation on a screen displayed on the display 206a by the accepting unit 32. Thereby, the transmission/reception unit 11 of the DNS server 10 receives the request to set access control settings transmitted from the administrator terminal 30.

In step S12, when the transmission/reception unit 11 of the DNS server 10 receives the request to set access control settings, the transmission/reception unit 11 transmits settings screen data, which is an input screen for requested settings to the administrator terminal 30. Thereby, the transmission/reception unit 31 of the administrator terminal 30 receives the settings screen data transmitted from the DNS server 10.

Figure 9:
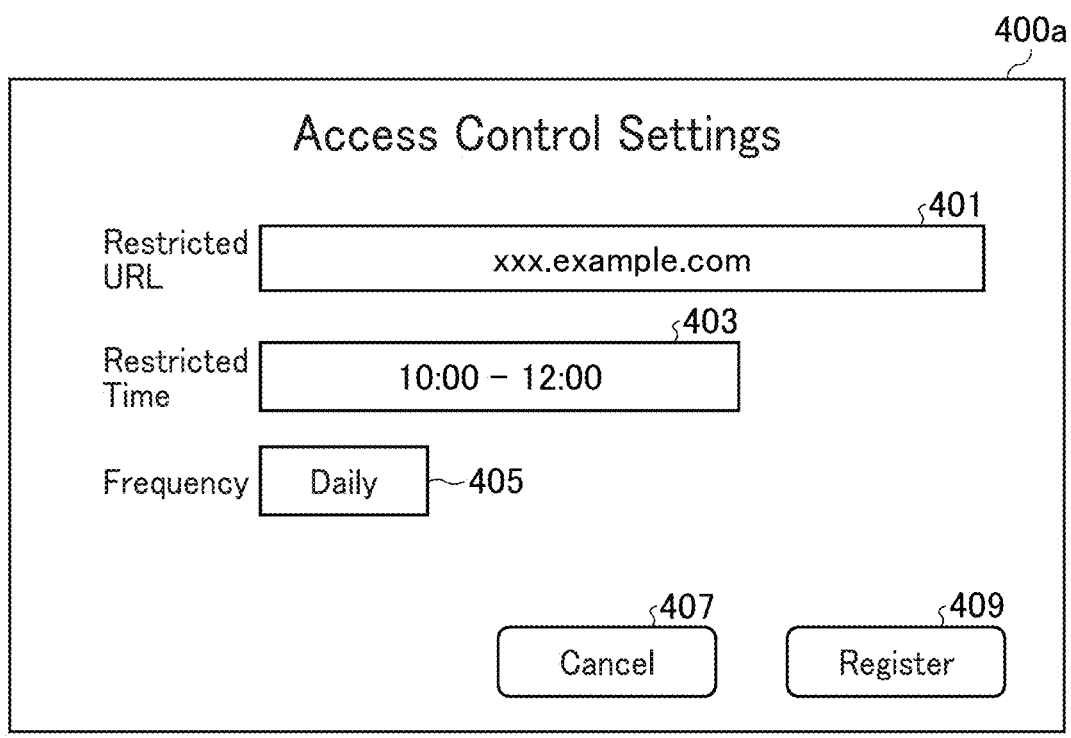
FIG. 9 is a diagram illustrating an example of an access control settings screen displayed on an administrator terminal according to the first embodiment of the present disclosure.

In step S13, when the settings screen data is received by the transmission/reception unit 31, the display control unit 33 of the administrator terminal 30 displays the access control settings screen 400*a* illustrated in FIG. 9 on the display 206*a*.

FIG. 9 is a diagram illustrating an example of an access control settings screen displayed on the administrator terminal according to the first embodiment. The access control settings screen 400*a* illustrated in FIG. 9 includes a restricted URL input area 401 for inputting a URL for identifying an access target server 70 that restricts (prohibits) access from the user terminal 50, a requested time input area 403 for inputting a time period for restricting (prohibiting) access to the restricted URL, a frequency input area 405 for inputting a frequency for restricting (prohibiting) access to the restricted URL, a cancel button 407 to be pressed when cancelling the input, and a registration button 409 to be pressed when setting information input to the screen as the access control settings. The access control settings screen 400*a* is an example of an input screen for setting requested settings.

In step S14, the accepting unit 32 of the administrator terminal 30 accepts an input to each input area of the access control settings screen 400*a*. In the example illustrated in FIG. 9, the accepting unit 32 accepts an input of a restricted URL "xxx.example.com", a restricted time "10:00-12:00", and a frequency "daily". Here, the input information on the restricted time and the frequency of restriction becomes the restricted period. Note that the input to each input area of the access control settings screen 400*a* may be directly input by the administrator using an input device such as the keyboard 205, or candidates may be displayed in a pull-down format or the like to select an option.

In step S15, the transmission/reception unit 31 of the administrator terminal 30 transmits requested settings for access control settings for the access target server 70 to the DNS server 10. Specifically, the transmission/reception unit 31 transmits requested settings to the DNS server 10 when pressing of the registration button 409 included in the access control settings screen 400*a* displayed on the display 206*a* is accepted by the accepting unit 32. Here, the requested settings include the restricted URL and the restricted period that includes the restricted time and the frequency, input on the access control settings screen 400*a*. Thereby, the transmission/reception unit 11 of the DNS server 10 receives the requested settings transmitted from the administrator terminal 30.

In step S16, when the requested settings are received by the transmission/reception unit 11, the setting unit 12 of the DNS server 10 sets access control settings for restricting (prohibiting) access (connection) to the access target server 70 from the user terminal 50. Specifically, the setting unit 12 sets the access control settings by storing the restricted URL and the restricted period included in the requested settings in the access control management table 150*a* stored in the storage unit 100. In the example of the access control settings screen 400*a* illustrated in FIG. 9, the setting unit 12 sets access control settings associated with "No. 1" included in the access control management table 150*a* illustrated in FIG. 7.

Thereby, the network system 1*a* can set the access control settings by the administrator who uses the administrator terminal 30 by using the screen data provided from the DNS server 10. Since the access control settings based on host information and date and time can be added and switched flexibly at any time, administrative workload on the administrator can be reduced.

Access Process to Access Target Server

Figure 10:
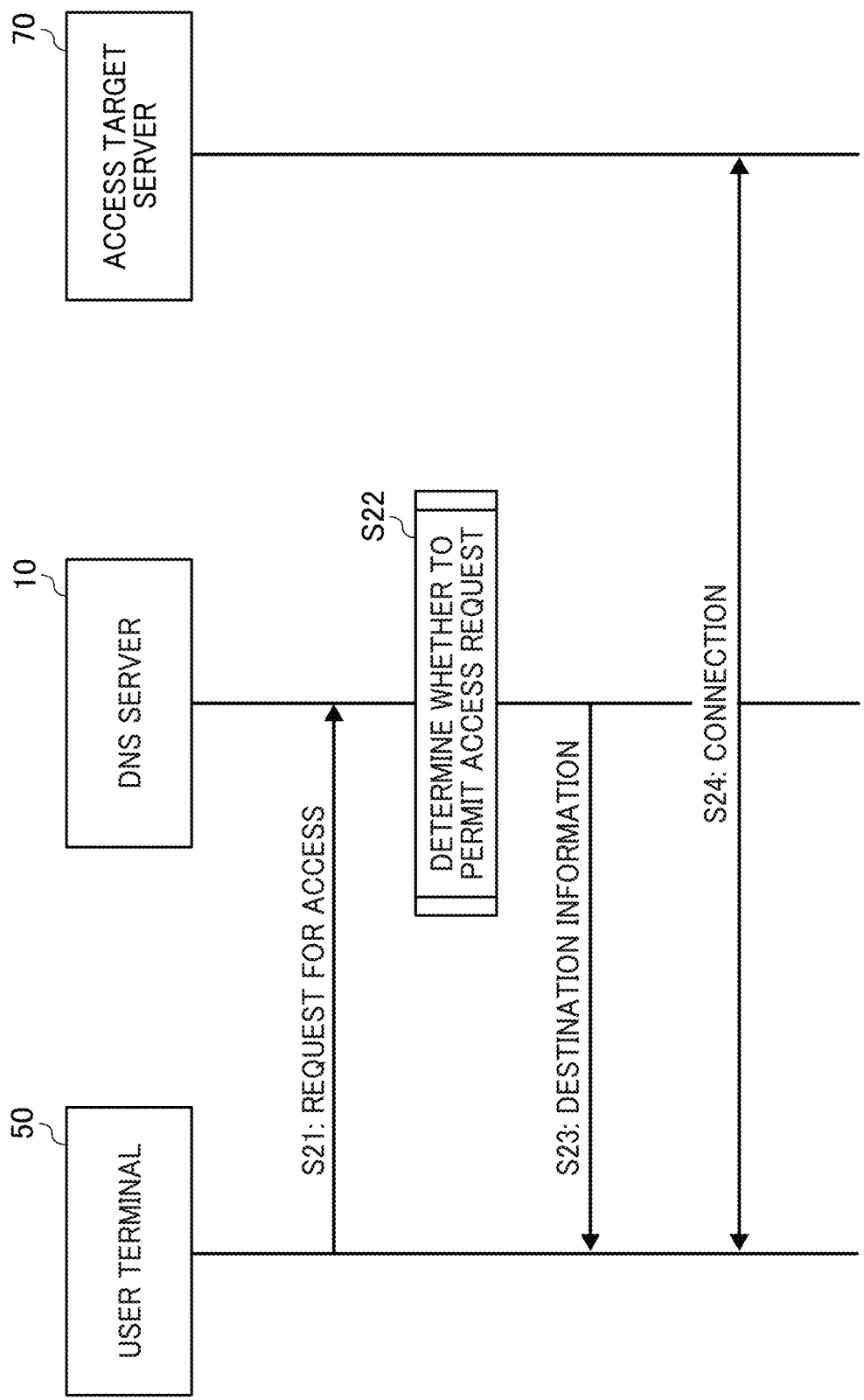
FIG. 10 is a sequence diagram illustrating an example of the access process from the user terminal to the access target server according to the first embodiment of the present disclosure.

Hereinafter, an access process to the access target server 70 from the user terminal 50 is described with reference to FIGS. 10 to 12. FIG. 10 is a sequence diagram illustrating an example of the access process from the user terminal to the access target server according to the first embodiment. The process illustrated in FIG. 10 assumes that the access control management table 150*a* illustrated in FIG. 7 is stored in the DNS server 10 by the process illustrated in FIG. 8.

In step S21, the transmission/reception unit 51 of the user terminal 50 transmits an access request to the access target server 70 to the DNS server 10. The access request is, for example, a DNS query (name resolution request) that is an IP address inquiry from the user terminal 50 to the DNS server 10. The access request includes host information such as a URL of the access target server 70 that is the access request destination. Thereby, the transmission/reception unit 11 of the DNS server 10 receives the access request transmitted from the user terminal 50.

In step S22, the determination unit 13 of the DNS server 10 determines whether the user terminal 50 is permitted to access the access request destination based on the access request received by the transmission/reception unit 11 and the access control management table 150*a* stored in the storage unit 100. A process executed by the DNS server 10 to determine whether the user terminal 50 is permitted to access the access request destination is described in detail with reference to FIG. 11. FIG. 11 is a flowchart illustrating an example of the process for determining whether an access to the access target server is permitted executed by the DNS server according to the first embodiment of the present disclosure.

In step S221, when the access request is received by the transmission/reception unit 11, the time information acquisition unit 14 of the DNS server 10 acquires the current time using the timer 209. Here, the time indicated in the time information acquired by the time information acquisition unit 14 is an example of a scheduled access time. Note that the scheduled access time may not be the time when the access request transmitted from the user terminal 50 is received, but the time when the access request is transmitted by the user terminal 50. In the above described case, the access request received by the transmission/reception unit 11 includes transmission time of the user terminal 50. Then, the time information acquisition unit 14 acquires transmission time information included in the access request.

In step S222, the storage/reading unit 15 of the DNS server 10 reads the access control management table 150*a* stored in the storage unit 100. In step S223, the determination unit 13 of the DNS server 10 determines whether to accept the access request of the user terminal 50 to the access request destination based on the access request received by the transmission/reception unit 11, the time information acquired by the time information acquisition unit 14, and the access control management table 150*a* read by the storage/reading unit 15. Specifically, the determination unit 13 extracts the restricted URL stored in the access control management table 150*a* using the host information included in the access request received by the transmission/reception unit 11 as a search key. Then, when the time indicated by the time information acquired by the time information acquisition unit 14 is within the restricted period associated with the extracted restricted URL, the determination unit 13 restricts (prohibits) access to the access request destination of the user terminal 50. On the other hand, when the time indicated by the time information acquired by the time information acquisition unit 14 is outside the restricted period associated with the extracted restricted URL, the determination unit 13 accepts the access of the user terminal 50 to the access request destination.

In step S224, when the determination unit 13 of the DNS server 10 permits access to the access request destination of the user terminal 50, the process proceeds to step S225. On the other hand, when the determination unit 13 of the DNS server 10 does not permit access to the access request destination of the user terminal 50, that is, restricts (prohibits) access to the access request destination of the user terminal 50, the process proceeds to step S226.

In step S225, the transmission/reception unit 11 of the DNS server 10 transmits the destination information of the access request destination to the user terminal 50. The destination information of the access request destination is an IP address of an access target server 70 that is an access request destination from the user terminal 50. The destination information of the access request destination is an example of first destination information. On the other hand, in step S226, the transmission/reception unit 11 of the DNS server 10 transmits dummy destination information to the user terminal 50. The dummy destination information is, for example, an IP address different from the IP address of an access target server 70 that is an access request destination of the user terminal 50. The dummy IP address is an example of second destination information.

Thereby, the DNS server 10 can restrict the access of the user terminal 50 to the access target server 70 through the internet 7 within the restricted period associated with the host information for identifying the access target server 70 that is the access request destination of the user terminal 50.

Returning to FIG. 10, the description of the access process to the access target server 70 from the user terminal 50 is continued. In the following description, a case where access to the access request destination of the user terminal 50 is permitted by the process executed by the DNS server 10 illustrated in FIG. 11 (step S225) is described.

In step S23, the transmission/reception unit 11 of the DNS server 10 transmits the destination information of the access request destination indicated by the received access request to the user terminal 50. Thereby, the transmission/reception unit 51 of the user terminal 50 receives the destination information transmitted from the DNS server 10.

In step S24, the transmission/reception unit 51 of the user terminal 50 connects to the access target server 70 by transmitting a connection request to the access target server 70 using the received destination information. Specifically, the transmission/reception unit 51 transmits a request such as HTTP (an example of a connection request) to the access target server 70 indicated by the received destination information. Then, the transmission/reception unit 71 of the access target server 70 transmits information on a web page provided by the access target server 70 to the user terminal 50 as a response to the received request. As a result, the user terminal 50 can access (connect to) the access target server 70 through the internet 7 and use web service.

Figure 11:
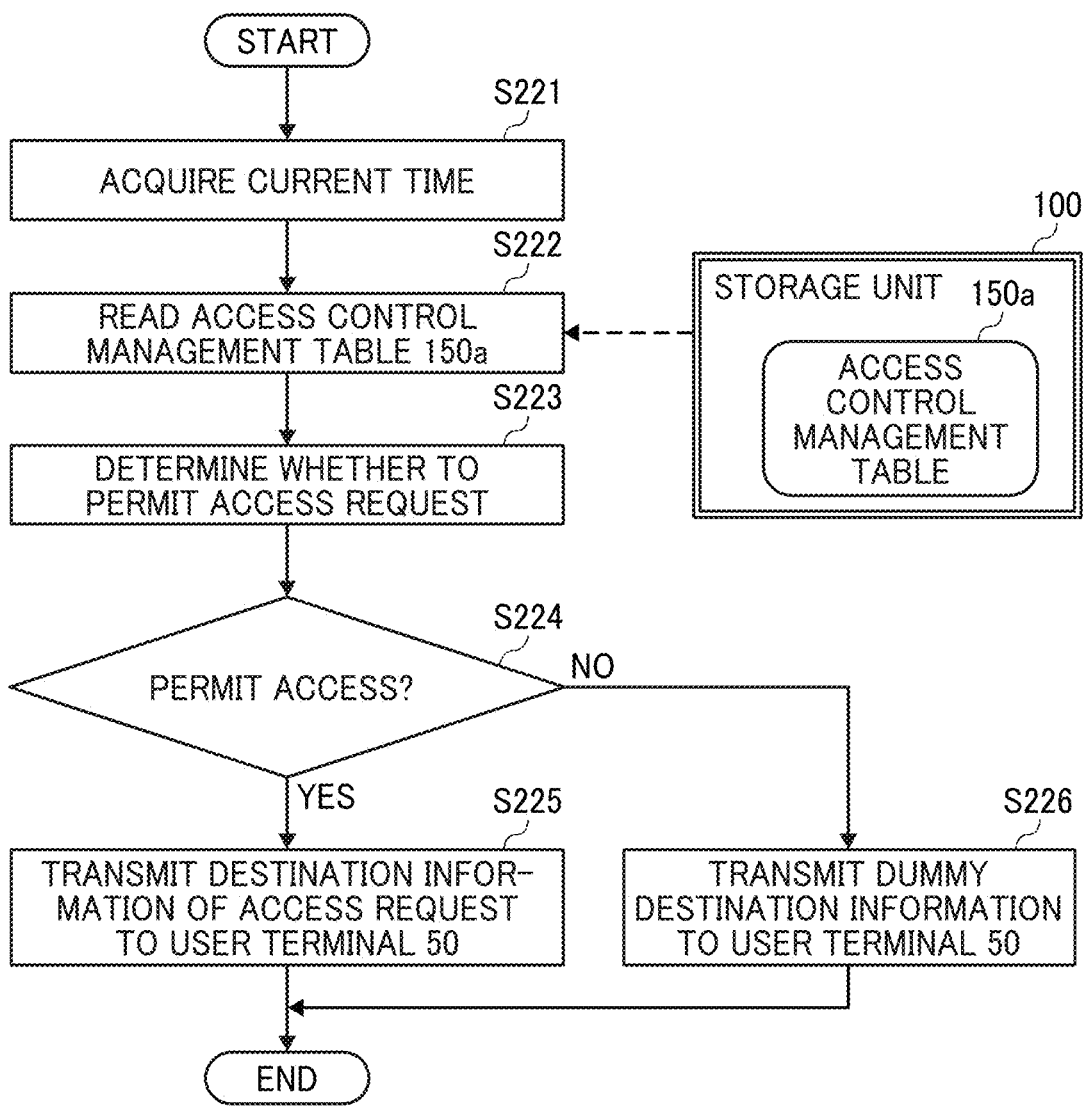
FIG. 11 is a flowchart illustrating an example of a process for determining whether an access to the access target server is permitted executed by the DNS server according to the first embodiment of the present disclosure.

When access to the access request destination of the user terminal 50 is not permitted by the process executed by the DNS server 10 illustrated in FIG. 11 (step S226), the transmission/reception unit 11 of the DNS server 10 may transmit its own address to the user terminal 50 as dummy destination information. In this case, the transmission/reception unit 51 of the user terminal 50 transmits a request such as HTTP (an example of a connection request) to the DNS server 10. Then, the transmission/reception unit 51 of the DNS server 10 transmits access prohibition screen data indicating that access is restricted (prohibited) to the user terminal 50 as a response to the request. The display control unit 53 of the user terminal 50 displays the access prohibition screen data received by the transmission/reception unit 51 on the display 206*a* of the user terminal 50 as the access prohibition screen 600 illustrated in FIG. 12 to convey information to the user that the access is restricted (prohibited).

Effect of First Embodiment

In the network system 1*a* according to the first embodiment, the DNS server 10 provides screen data for setting access control to the administrator terminal 30, and the administrator terminal 30 inputs host information such as the URL of the access target server 70 for which access is to be restricted (prohibited) and restricted period (an example of condition information) that is a period to restrict the access. The DNS server 10 receives the requested settings including host information and restricted period input by the administrator terminal 30 from the administrator terminal 30 and sets the received requested settings as the access control settings. Then, the DNS server 10 responds to the name resolution request from the user terminal 50 based on the set access control settings.

As a result, in the network system 1*a*, when switching the access control settings based on host information and date and time, since it is not necessary for the administrator to frequently perform settings change operations on the DNS server 10, administrator's workload can be reduced. Moreover, the network system 1*a* can restrict communication through the internet of the user terminal 50 only for a period based on the access control settings set in the DNS server 10.

Variation of First Embodiment

Hereinafter, a network system according to a modification of the first embodiment is described. In the network system according to the modification of the first embodiment, the access control settings used for access control by the DNS server 10 is not a period (restricted period) for restricting access to the access target server 70 from the user terminal 50, but a period during which access from the terminal 50 to the access target server 70 is permitted (permitted period) is used.

Access Control Management Table

Figures 12, 13:
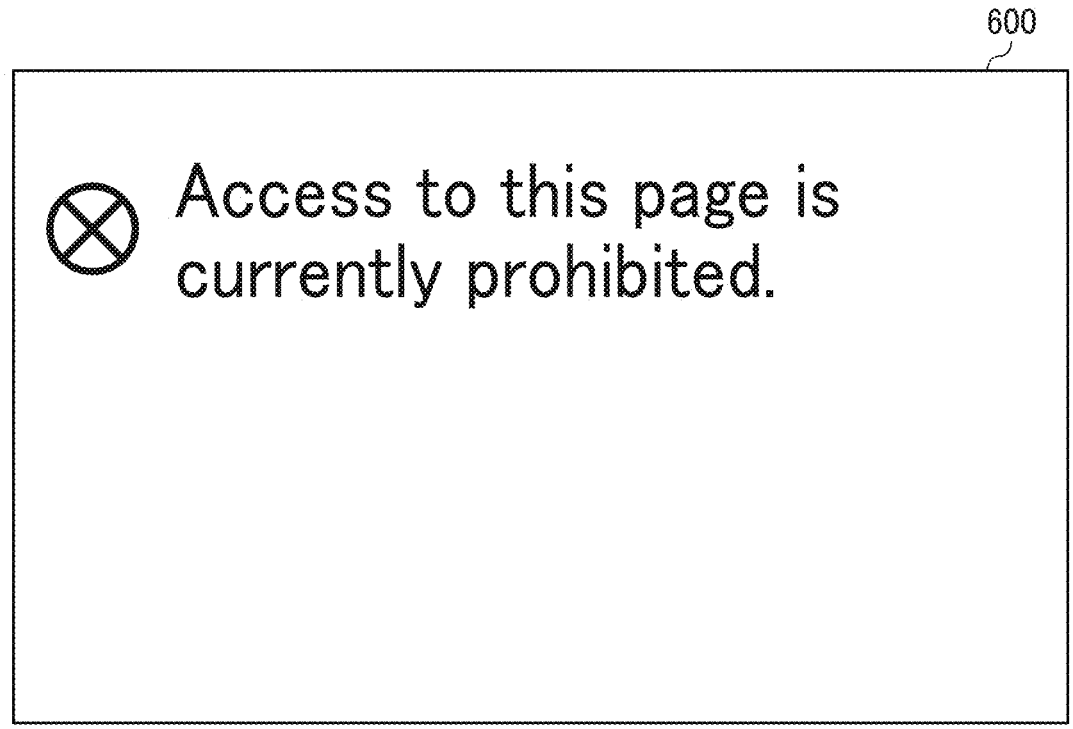
FIG. 12 is a diagram illustrating an example of an access prohibition screen displayed on the user terminal according to the first embodiment of the present disclosure.
FIG. 13 is a diagram illustrating an example of an access control management table according to a modification of the first embodiment of the present disclosure.

FIG. 13 is a diagram illustrating an example of an access control management table according to the modification of the first embodiment of the present disclosure. The access control management table 150*aa* illustrated in FIG. 13 replaces the restricted period information included in the access control management table 150*a* with permitted period indicating a period during which access to the access target server 70 from the user terminal 50 is permitted. The permitted period is stored and managed in association with a restricted URL for identifying the access target server 70 that restricts (prohibits) access from the user terminal 50.

The permitted period indicates a period during which access to the associated restricted URL is permitted. The permitted period indicates a period such as a time slot, a day of the week, a date, a frequency, a weekday, a holiday, or a high day in which access to the access target server 70 from the user terminal 50 is permitted. The permitted period is an example of condition information indicating conditions for controlling access to the access target server 70. For example, in the access control management table 150*aa*, the permitted period for access to the restricted URL "xxx.example.com" is "0:00-10:00, 12:00-0:00 daily", the permitted period for access to "yyy.example.com" is "0:00-13:00, 15:00-0:00 daily", and permitted period for access to restricted URL "zzz.example.com" is "14:00-16:00 Monday".

The access control settings stored in the access control management table 150aa may be set for each user terminal 50 or each user, similar to the access control management table 150a.

The DNS server 10 according to the modification of the first embodiment controls access to the access target server 70 from the user terminal 50 using the access control management table 150aa illustrated in FIG. 13. Specifically, in the process illustrated in step S223 of FIG. 11, the DNS server 10 determines whether the user terminal 50 is permitted to access the access request destination based on the access control management table 150aa. The determination unit 13 extracts the restricted URL included in the access control management table 150aa using the host information included in the access request received by the transmission/reception unit 11 as a search key. Then, when the time acquired by the time information acquisition unit 14 is outside the permitted period associated with the extracted restricted URL, the determination unit 13 restrict (prohibit) the access to the access request destination of the user terminal 50. On the other hand, when the time acquired by the time information acquisition unit 14 is within the permitted period associated with the extracted restricted URL, the determination unit 13 permits the access of the user terminal 50 the access request destination.

Thereby, the network system according to the first embodiment can permit communication through the internet 7 of the user terminal 50 only for a period based on the access control settings stored in the DNS server 10.

Second Embodiment

Hereinafter, a network system according to a second embodiment is described. The same configurations and the same functions as those of the first embodiment are denoted by the same reference numerals, and the description thereof is omitted. The network system according to the second embodiment is a system in which access control settings are set in cooperation with an external server, instead of an administrator directly designating a period during which access is restricted (restricted period).

System Configuration

Figure 14:
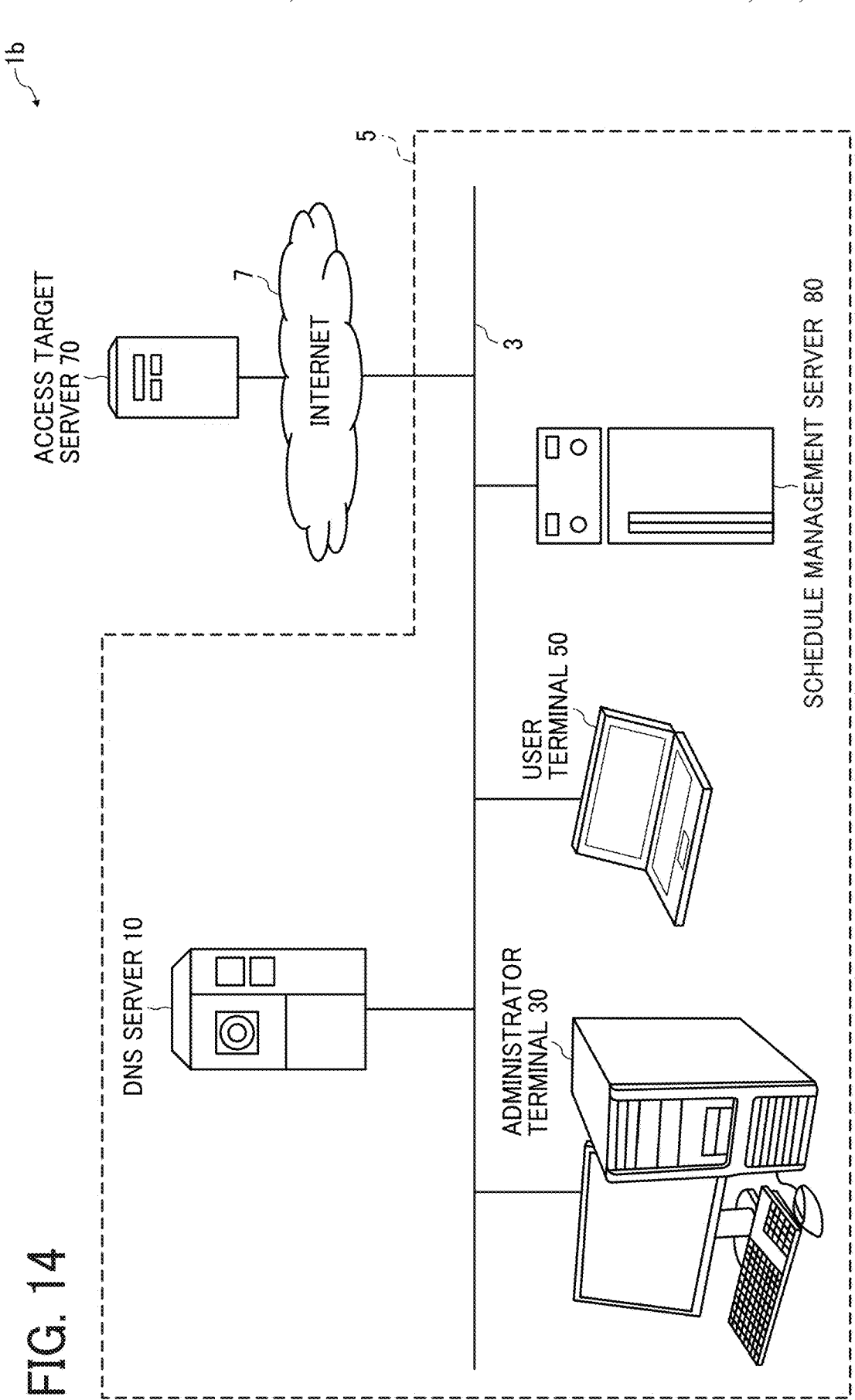
FIG. 14 is a diagram illustrating an example of a system configuration of a network system according to a second embodiment of the present disclosure.

FIG. 14 is a diagram illustrating an example of a system configuration of the network system according to the second embodiment of the present disclosure. A network system 1b illustrated in FIG. 14 includes a schedule management server 80 in the local network 5 in addition to the configuration of the network system 1a illustrated in FIG. 1. The schedule management server 80 is a server in which a schedule such as a timetable or facility reservation including a type and period of a schedule are registered and managed. The schedule management server 80 is, for example, a timetable management server used at educational sites such as universities, a scheduler server used in an organization such as a company, and the like.

FIG. 14 illustrates a configuration in which the schedule management server 80 is located in the local network 5, but the schedule management server 80 may communicate with a device or terminal in the local network 5 through the internet 7. In the following description, it is assumed that the schedule management server 80 is a timetable management server used in an educational setting such as a university, but the schedule management server 80 may be a server used at a site such as a company, a hospital or a factory, or an event with a schedule such as a training, an academic conference, a lecture, or an exhibition.

Overview

Figure 15:
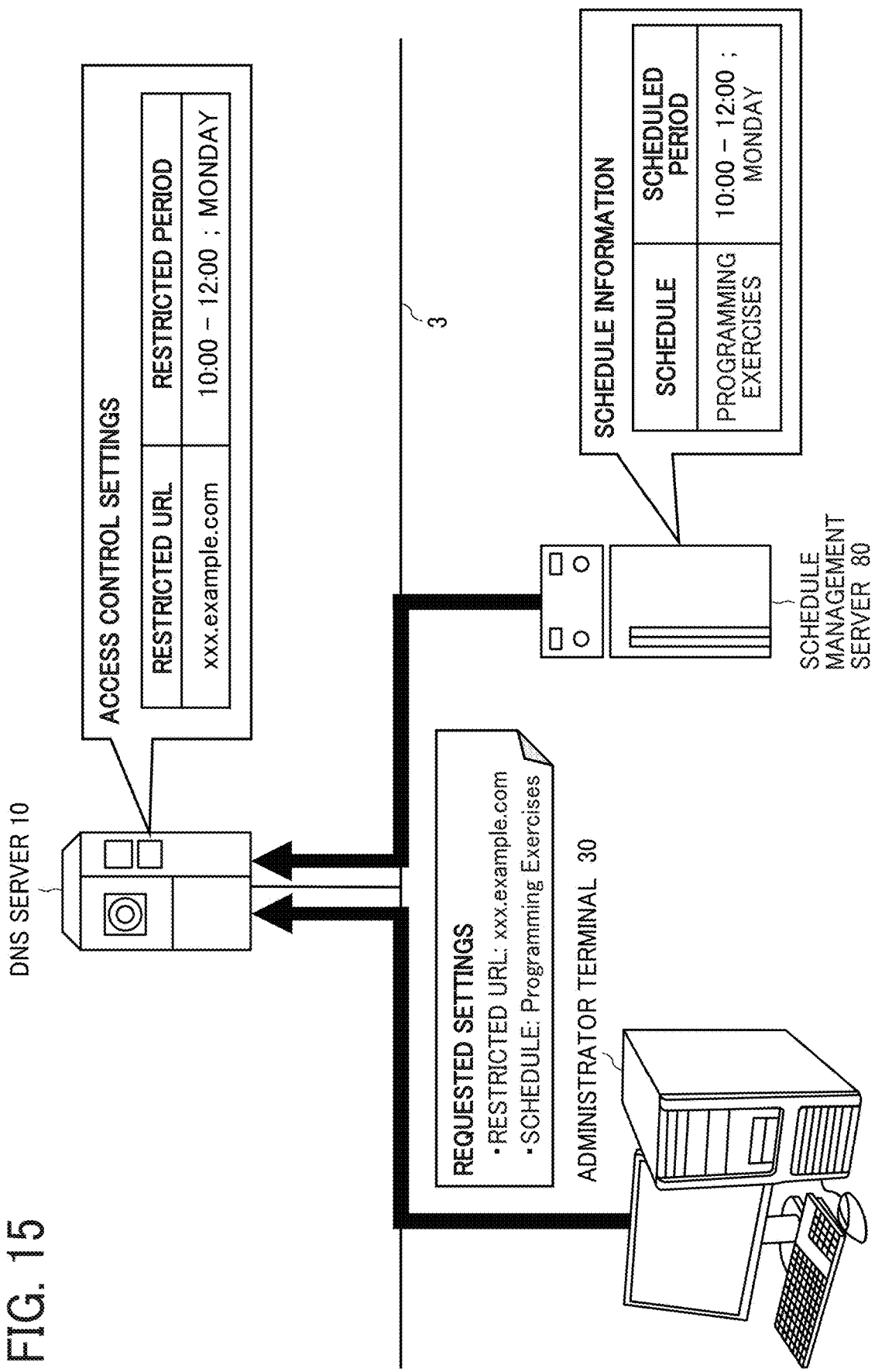
FIG. 15 is a schematic diagram illustrating an example of an access control setting process in the network system according to the second embodiment of the present disclosure.

FIG. 15 is a schematic diagram illustrating an example of an access control setting process in the network system according to the second embodiment of the present disclosure. In the network system 1b illustrated in FIG. 15, the administrator terminal 30 transmits to the DNS server 10, the requested settings including the URL (restricted URL) of the access target server 70 for which access from the user terminal 50 is to be restricted (prohibited) and the schedule name to identify the schedule for which the access is to be restricted. The administrator who uses the administrator terminal 30 inputs the requested settings using the input screen provided from the DNS server 10 as in the first embodiment.

The DNS server 10 transmits the schedule name included in the requested settings transmitted from the administrator terminal 30 to the schedule management server 80. The schedule management server 80 transmits to the DNS server 10 scheduled period associated with the schedule name transmitted from the DNS server 10 included in a schedule management table 850 described below. Thereby, the DNS server 10 stores the access control settings associated with the restricted URL transmitted from the administrator terminal 30 and the scheduled period transmitted from the schedule management server 80 in the access control management table 150b described below. Thereby, the DNS server 10 sets the access control settings without directly inputting the period for which the administrator using the administrator terminal 30 wants to restrict the access by cooperating with the schedule management server 80 which is an external server. As a result, it is possible to provide an administrator with an intuitive setting operation with few input errors.

Functional Configuration

Figure 16:
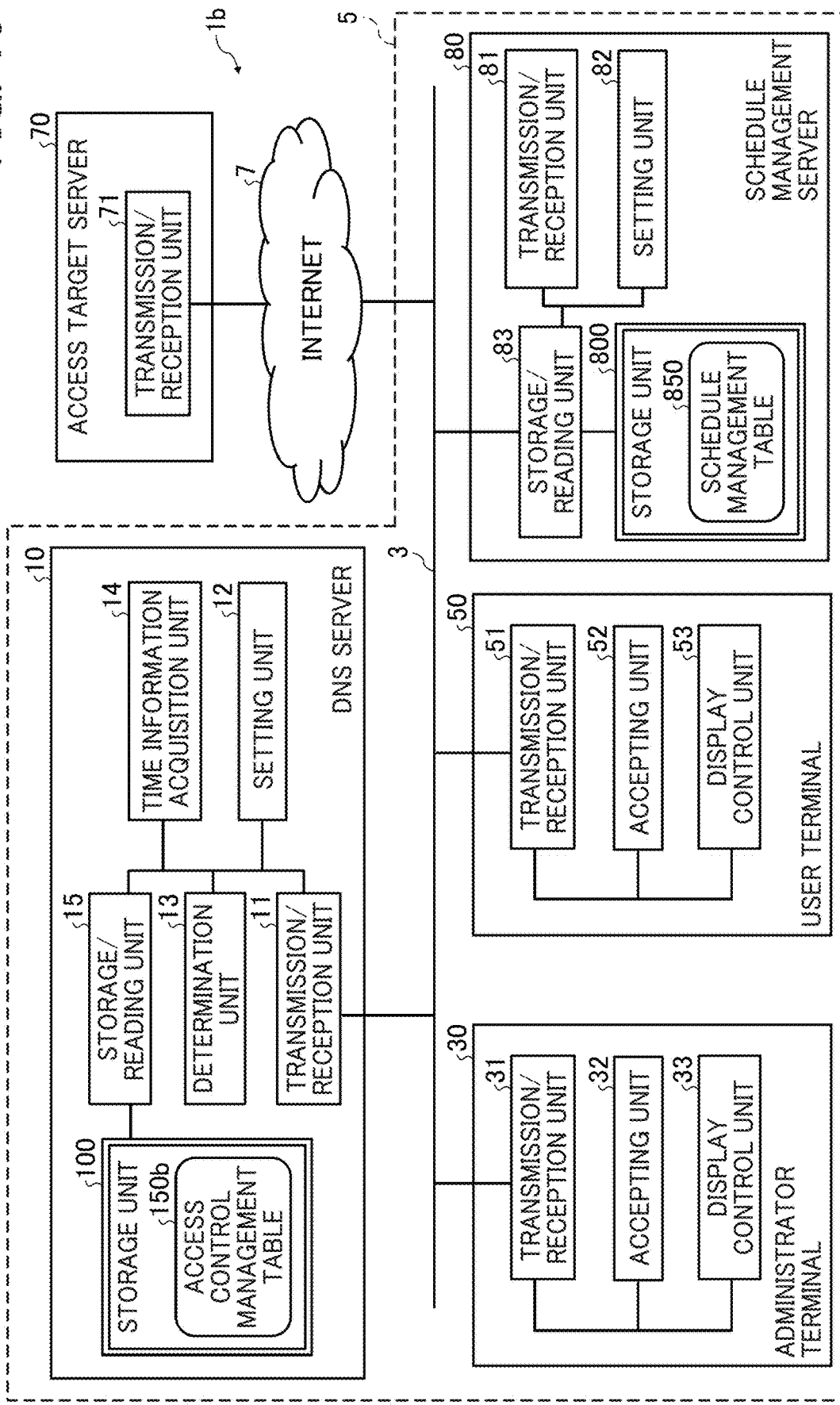
FIG. 16 is a block diagram illustrating an example of a functional configuration of a network system according to the second embodiment of the present disclosure.

FIG. 16 is a diagram illustrating an example of a functional configuration of a network system according to the second embodiment of the present disclosure. The functional configurations of the administrator terminal 30, the user terminal 50, and the access target server 70 included in the network system 1b are the same as the functional configurations illustrated in FIG. 6, and the description thereof is omitted.

Functional Configuration of DNS Server

Hereinafter, the functional configuration of the DNS server 10 according to the second embodiment is described. The storage unit 100 of the DNS server 10 according to the second embodiment stores an access control management table 150b instead of the access control management table 150a illustrated in FIG. 7.

Access Control Management Table

FIG. 17 is a diagram illustrating an example of an access control management table according to the second embodiment of the present disclosure. The access control management table 150b illustrated in FIG. 17 is different from the access control management table 150a illustrated in FIG. 7 in that the restricted period included in the access control management table 150b is linked with scheduled period in the schedule management table 850 described below.

Functional Configuration of Schedule Management Server

Hereinafter, the functional configuration of the schedule management server 80 is described. The schedule management server 80 illustrated in FIG. 16 includes a transmission/reception unit 81, a setting unit 82, a storage/reading unit 83, and a storage unit 800.

The transmission/reception unit 81 transmits and receives various data to and from an external device. The transmission/reception unit 81 transmits and receives various data (information) to and from the DNS server 10 in the local network 5, for example. For example, the transmission/reception unit 81 receives a schedule information acquisition request from the DNS server 10. In addition, the transmission/reception unit 81 transmits, for example, schedule information corresponding to the schedule name transmitted from the DNS server 10 to the DNS server 10. The transmission/reception unit 81 is implemented by, for example, the network I/F 208 and a program executed by the CPU 201 illustrated in FIG. 5.

The setting unit 82 sets schedule information included in the schedule management table 850. The setting unit 82 is implemented by, for example, a program executed by the CPU 201 illustrated in FIG. 5.

The storage/reading unit 83 stores various data in the storage unit 800 and reads various data from the storage unit 800. The storage/reading unit 83 is implemented by, for example, a program executed by the CPU 201 illustrated in FIG. 5. Further, the storage unit 800 is implemented by, for example, the ROM 202, the storage 204, the storage medium 207a, or the like illustrated in FIG. 5. Furthermore, the storage unit 800 stores the schedule management table 850.

Schedule Management Table

FIG. 18 is a diagram illustrating an example of the schedule management table according to the second embodiment of the present disclosure. The schedule management table 850 illustrated in FIG. 18 is a table in which a schedule type such as a timetable or facility reservation and a scheduled period are set. The schedule management table 850 stores a name of a schedule for identifying a schedule and scheduled period indicating a period in which the schedule is implemented (held) in association with each other. Here, the schedule name is an example of schedule identification information for identifying a schedule. The schedule identification information may be a schedule identifier (ID) for identifying a schedule in addition to the schedule name or in place of the schedule name. For example, in the schedule management table 850, the scheduled period in which the schedule name "Programming Exercises" is implemented is "10:00-12:00 Monday", the scheduled period in which the schedule name "Basic German" is implemented is "13:00-14:30 Wednesday" and the scheduled period for the schedule name "Patent Education" is "9:00-17:00 Friday".

Process and Operation of Second Embodiment Access Control Setting Process

Figure 19:
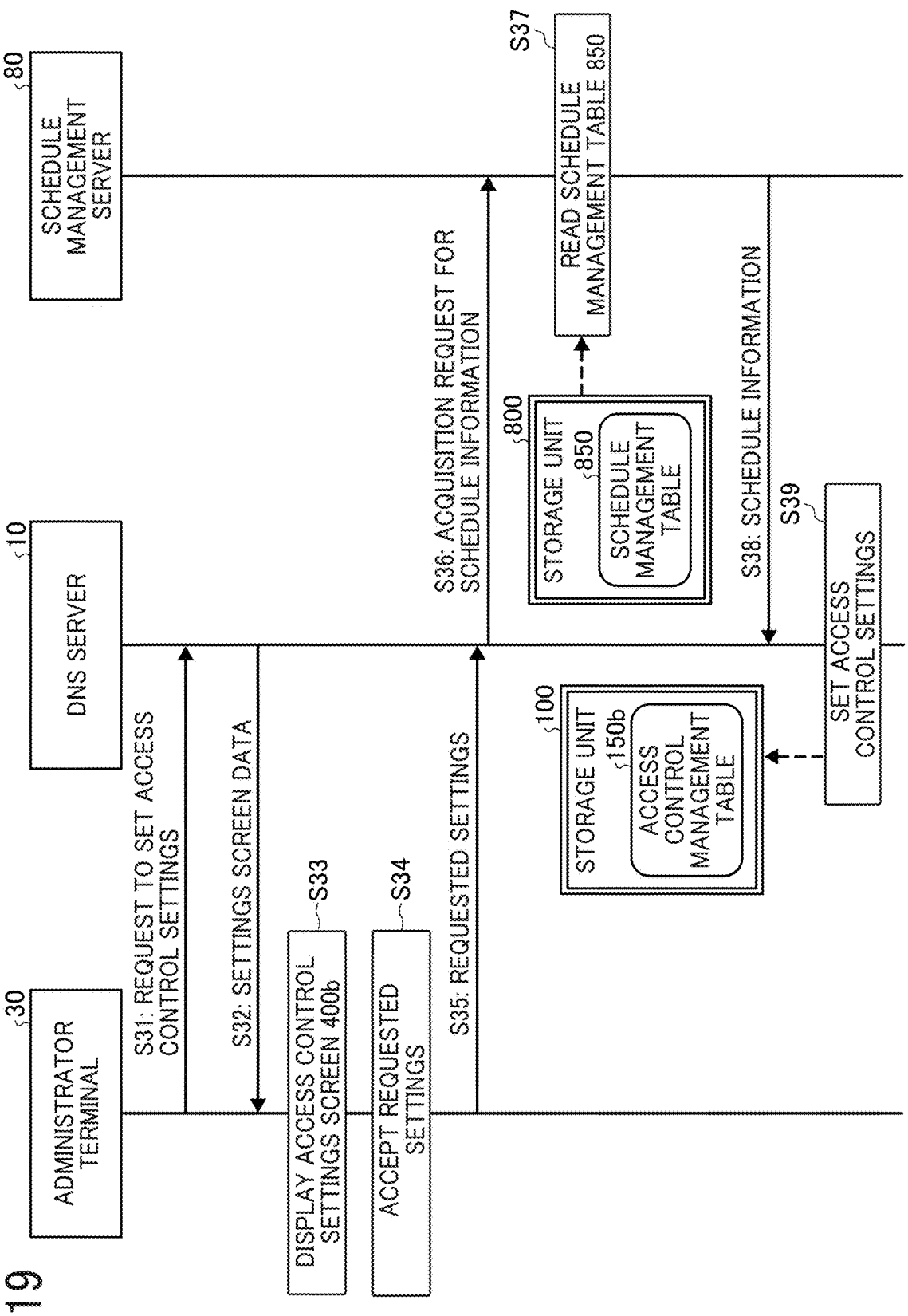
FIG. 19 is a sequence diagram illustrating an example of the access control setting process according to the second embodiment of the present disclosure.

Hereinafter, processing and operation of the network system according to the second embodiment is described with reference to FIGS. 19 and 20. Note that the process of accessing (connecting) to the access target server 70 from the user terminal 50 is the same as the processes illustrated in FIGS. 10 to 12. FIG. 19 is a sequence diagram illustrating an example of the access control setting process according to the second embodiment of the present disclosure.

In step S31, the transmission/reception unit 31 of the administrator terminal 30 issues a request to set access control settings to the DNS server 10 based on a user input operation on a screen displayed on the display 206a by the accepting unit 32. Thereby, the transmission/reception unit 11 of the DNS server 10 receives the request to set access control settings transmitted from the administrator terminal 30.

In step S32, when the transmission/reception unit 11 of the DNS server 10 receives the request to set access control settings, the transmission/reception unit 11 transmits settings screen data for inputting requested settings for setting access control settings to the administrator terminal 30. Thereby, the transmission/reception unit 31 of the administrator terminal 30 receives the settings screen data transmitted from the DNS server 10.

Figure 20:
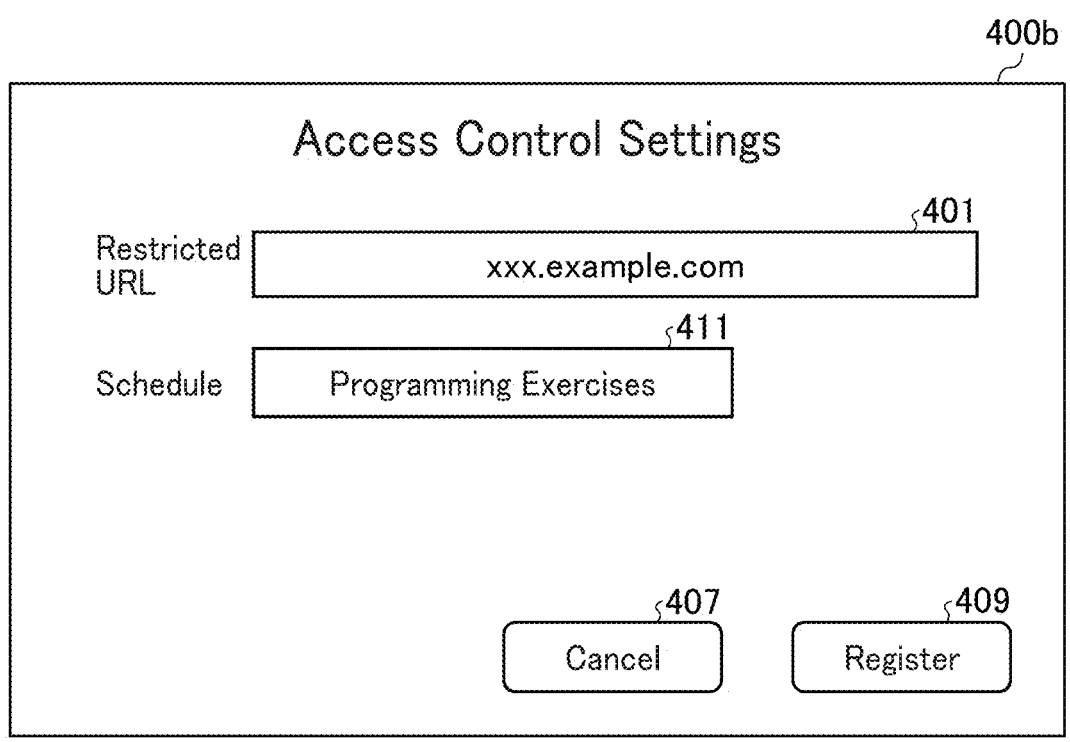
FIG. 20 is a diagram illustrating an example of an access control settings screen displayed on the administrator terminal according to the second embodiment of the present disclosure.

In step S33, when the settings screen data is received by the transmission/reception unit 31, the display control unit 33 of the administrator terminal 30 displays the access control settings screen 400b illustrated in FIG. 20 on the display 206a.

FIG. 20 is a diagram illustrating an example of an access control settings screen displayed on the administrator terminal according to the second embodiment of the present disclosure. The access control settings screen 400b illustrated in FIG. 20 includes a restricted URL input area 401 for inputting a URL (restricted URL) for identifying an access target server 70 that restricts (prohibits) access from the user terminal 50, schedule name input area 411 for inputting the name of the schedule for which access is restricted, a cancel button 407 to be pressed when canceling the setting process, and a registration button 409 to be pressed when registering information input to each input area as access control settings. The access control settings screen 400b is an example of an input screen for requested settings for setting access control settings. The schedule name input to the schedule name input area 411 is an example of schedule identification information.

In step S34, the accepting unit 32 of the administrator terminal 30 accepts an input to each input area of the access control settings screen 400b. In the example illustrated in FIG. 20, the accepting unit 32 accepts an input of a restricted URL "xxx.example.com" and a schedule name "Programming Exercises". Note that the input to each input area of the access control settings screen 400b may be directly input by the administrator using an input device such as the keyboard 205, or candidates may be displayed in a pull-down format or the like to select an option.

In step S35, the transmission/reception unit 31 of the administrator terminal 30 transmits requested settings for access control settings for the access target server 70 to the DNS server 10. Specifically, the transmission/reception unit 31 transmits requested settings to the DNS server 10 when pressing of the registration button 409 included in the access control settings screen 400b displayed on the display 206a is accepted by the accepting unit 32. Here, the requested settings include the restricted URL and the schedule name input on the access control settings screen 400b. Thereby, the transmission/reception unit 11 of the DNS server 10 receives the requested settings transmitted from the administrator terminal 30.

In step S36, the transmission/reception unit 11 of the DNS server 10 transmits a schedule information acquisition request to the schedule management server 80, in response to receiving the requested settings transmitted from the administrator terminal 30. Here, the schedule information acquisition request includes the schedule name included in the requested settings. Accordingly, the transmission/reception unit 81 of the schedule management server 80 receives the schedule information acquisition request transmitted from the DNS server 10.

In step S37, the storage/reading unit 83 of the schedule management server 80 reads the schedule management table 850 stored in the storage unit 800. Specifically, the storage/reading unit 83 associates the schedule name included in the schedule information acquisition request received by the transmission/reception unit 81 with the corresponding schedule name included in the schedule management table 850 and read schedule information associated with the schedule name.

In step S38, the transmission/reception unit 81 of the schedule management server 80 transmits the schedule information read by the storage/reading unit 83 to the DNS server 10. Thereby, the transmission/reception unit 11 of the DNS server 10 receives the schedule information transmitted from the schedule management server 80.

In step S39, the setting unit 12 of the DNS server 10 sets access control settings for restricting (prohibiting) access (connection) to the access target server 70 from the user terminal 50 in response to receiving the schedule information. Specifically, the access control settings are set by the setting unit 12 storing the restricted URL included in the requested settings received in step S35 and the scheduled period included in the schedule information received in step S38 in the access control management table 150b stored in the storage unit 100. In the example of the access control settings screen 400b illustrated in FIG. 20, the setting unit 12 sets access control settings associated with "No. 1" included in the access control management table 150b illustrated in FIG. 17.

Effect of Second Embodiment

In the network system 1b according to the second embodiment, since the administrator using the administrator terminal 30 can set access control settings without directly inputting time information such as day of the week and time by linking the DNS server 10 and the schedule management server 80, it is possible to provide an intuitive setting operation with few input errors.

Third Embodiment

Hereinafter, a network system according to a third embodiment is described. The same configurations and the same functions as those of the first embodiment are denoted by the same reference numerals, and the description thereof is omitted. The network system according to the third embodiment is a system that sets access control settings in cooperation with a network management server 90 that stores and manages network segment of each room in the local network 5.

System Configuration

Figure 21:
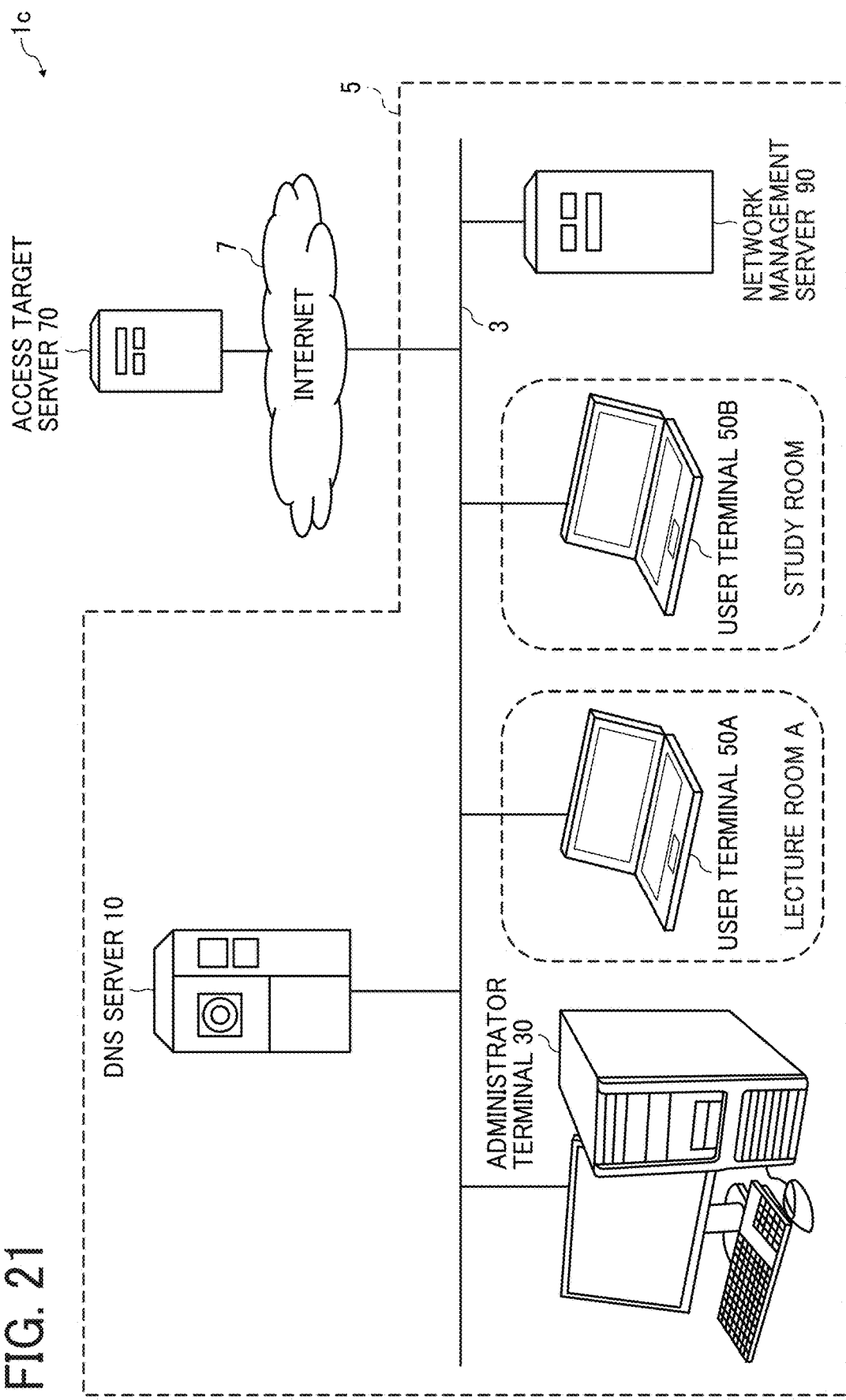
FIG. 21 is a diagram illustrating an example of a system configuration of the network system according to a third embodiment of the present disclosure.

FIG. 21 is a diagram illustrating an example of a system configuration of the network system according to a third embodiment of the present disclosure. A network system 1c illustrated in FIG. 21 includes a network management server 90 in the local network 5 in addition to the configuration of the network system 1a illustrated in FIG. 1. In the network system 1c, a lecture room A and a study room B having different network segments are provided in the local network 5, and a user terminal 50 (user terminal 50A and user terminal 50B) is located in each segment. The network management server 90 is a server that stores and manages network segments for different spaces having different network segments in the local network 5.

Note that although FIG. 21 illustrates a configuration in which the network management server 90 is located in the local network 5, alternatively the network management server 90 may communicate with a device or terminal in the local network 5 through the internet 7.

Overview

Figure 22:
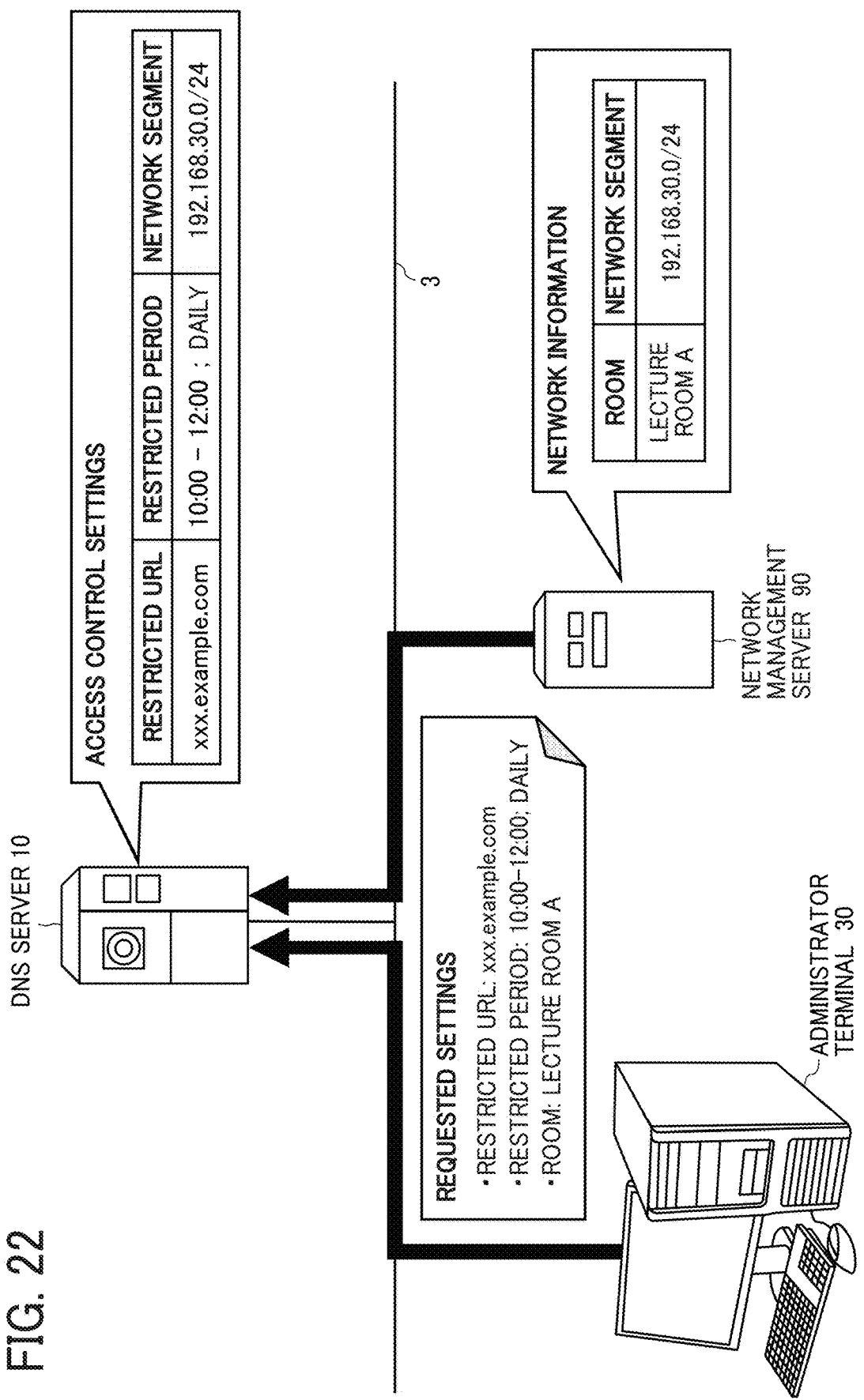
FIG. 22 is a schematic diagram illustrating an example of an access control setting process in the network system according to the third embodiment of the present disclosure.

FIG. 22 is a schematic diagram illustrating an example of an access control setting process in the network system according to the third embodiment of the present disclosure. In the network system 1c illustrated in FIG. 22, the administrator terminal 30 transmits requested settings including a URL (restricted URL) of the access target server 70 for which access from the user terminal 50 is to be restricted (prohibited), a restricted period indicating the period for which access from the user terminal 50 is to be restricted (prohibited), and a room name for identifying the room (space) for which the access is to be restricted, to the DNS server 10. The administrator who uses the administrator terminal 30 executes the access control setting process using the input screen provided from the DNS server 10.

The DNS server 10 transmits the room name included in the requested settings transmitted from the administrator terminal 30 to the network management server 90. The network management server 90 transmits segment information associated with the room name transmitted from the DNS server 10 included in the network management table 950 described below to the DNS server 10. The DNS server 10 stores the restricted URL and restricted period transmitted from the administrator terminal 30 and the access control settings associated with the segment information transmitted from the network management server 90 in an access control management table 150c described below. Since the DNS server 10 can set access control settings for each different network segment by cooperating with the network management server 90 which is an external server, the control rule can be set more flexibly.

Figure 23:
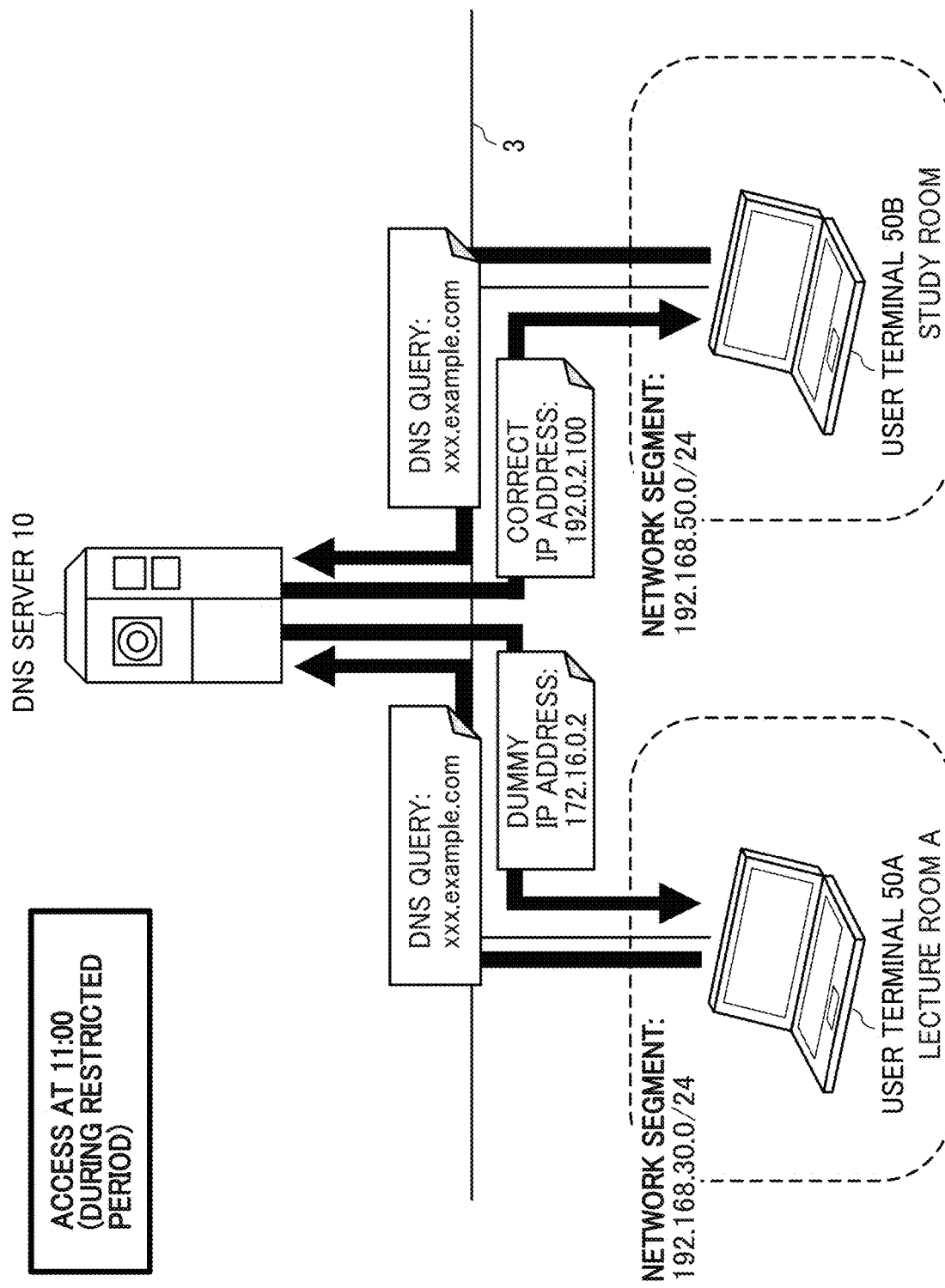
FIG. 23 is a schematic diagram illustrating an example of an access process from a user terminal to an access target server in the network system during a restricted period according to the third embodiment of the present disclosure.

Hereinafter, a process in which the user terminal 50 accesses the access target server 70 in the network system 1c according to the third embodiment is described with reference to FIG. 23. FIG. 23 is a schematic diagram illustrating an example of an access process from the user terminal to the access target server in the network system during a restricted period according to the third embodiment of the present disclosure. FIG. 23 illustrates a process in which the user terminal 50A and the user terminal 50B try to access the access target server 70 identified by the restricted URL within the restricted period set in the process illustrated in FIG. 22.

The user terminal 50A located in the lecture room A and the user terminal 50B located in the study room perform name resolution using the DNS server 10 when trying to access an access target server 70. Specifically, the user terminal 50A and the user terminal 50B transmit the URL (xxx.example.com) of the access target server 70 as a DNS query to the DNS server 10. The DNS server 10 restricts the access because the time when the DNS query including the restricted URL is received is within the restricted period included in the access control settings illustrated in FIG. 22.

The DNS server 10 transmits to the user terminal 50A located in the lecture room A having the network segment "192.168.30.0/24" associated with the restricted URL "xxx.example.com", an IP address "172.16.0.2" different from the IP address "192.0.2.100" of the access target server 70 (URL; "xxx.example.com"). The user terminal 50A receives the dummy IP address instead of the IP address of the access target server 70, and access (connection) from the user terminal 50A to the access target server 70 through the internet 7 is restricted. On the other hand, the DNS server 10 transmits to the user terminal 50B located in a study room having a network segment (192.168.50.0/24) different from the segment information "192.168.30.0/24" associated with the restricted URL "xxx.example.com", the IP address "192.0.2.100" of the access target server 70 (URL; "xxx.example.com"). The user terminal 50B can access (connect to) the access target server 70 through the internet 7 using the received IP address. The DNS server 10 can perform more flexible access control of the user terminal 50 through the internet 7 using the access control settings set for each network segment.

Functional Configuration

Figure 24:
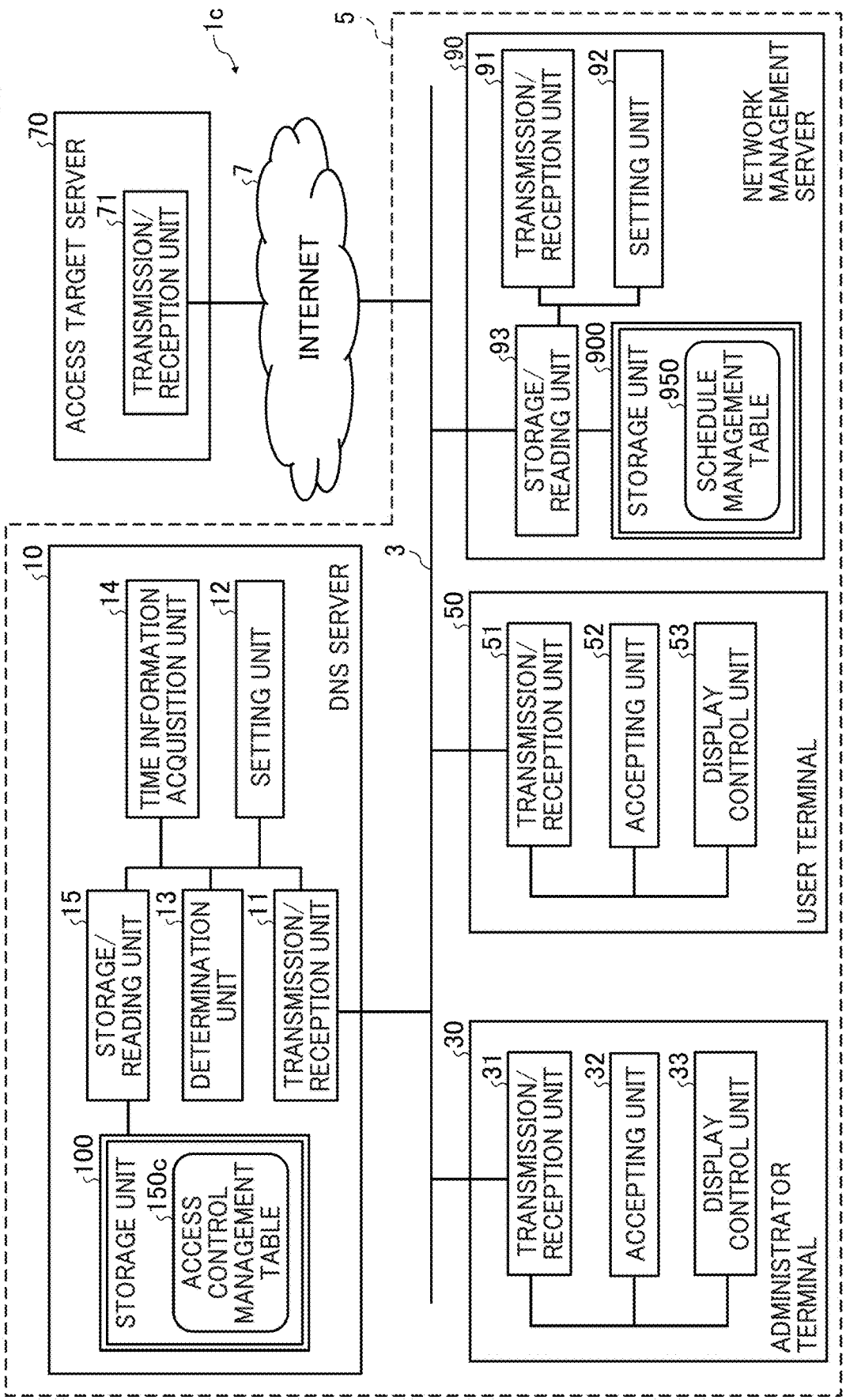
FIG. 24 is a block diagram illustrating an example of a functional configuration of the network system according to the third embodiment of the present disclosure.

FIG. 24 is a diagram illustrating an example of a functional configuration of the network system according to the third embodiment of the present disclosure. The functional configurations of the administrator terminal 30, the user terminal 50, and the access target server 70 included in the network system 1c are the same as the functional configurations illustrated in FIG. 6, the description thereof is omitted.

Functional Configuration of DNS Server

Hereinafter, a functional configuration of the DNS server 10 according to the third embodiment is described. The storage unit 100 of the DNS server 10 according to the third embodiment stores an access control management table 150c instead of the access control management table 150a illustrated in FIG. 7.

Access Control Management Table

FIG. 25 is a diagram illustrating an example of the access control management table according to the third embodiment of the present disclosure. The access control management table 150c illustrated in FIG. 25 is different from the access control management table 150a illustrated in FIG. 7 in that a network segment is associated with the restricted URL and restricted period. The network segment included in the access control management table 150c is acquired by cooperating with the network management server 90.

Functional Configuration of Network Management Server

Hereinafter, the functional configuration of the network management server 90 is described. The network management server 90 illustrated in FIG. 24 includes a transmission/reception unit 91, a setting unit 92, a storage/reading unit 93, and a storage unit 900.

The transmission/reception unit 91 transmits and receives various data to and from an external device. The transmission/reception unit 91 transmits and receives various data (information) to and from the DNS server 10 in the local network 5, for example. For example, the transmission/reception unit 91 receives a network information acquisition request from the DNS server 10. The transmission/reception unit 91 transmits network information corresponding to the room name transmitted from the DNS server 10 to the DNS server 10, for example. The transmission/reception unit 91 is implemented by, for example, the network I/F 208 and a program executed by the CPU 201 illustrated in FIG. 5.

The setting unit 92 sets network information included in the network management table 950. The setting unit 82 is implemented by, for example, a program executed by the CPU 201 illustrated in FIG. 5.

The storage/reading unit 93 stores various data in the storage unit 900 and reads various data from the storage unit 900. The storage/reading unit 93 is implemented by, for example, a program executed by the CPU 201 illustrated in FIG. 5. Further, the storage unit 900 is implemented by, for example, the ROM 202, the storage 204, the storage medium 207a, or the like illustrated in FIG. 5. Furthermore, the storage unit 900 stores a network management table 950.

Network Management Table

FIG. 26 is a diagram illustrating an example of the network management table according to the third embodiment of the present disclosure; the network management table 950 illustrated in FIG. 26 stores different network segment for each room in the local network 5. The network management table 950 stores a room name for identifying a room and a network segment assigned to the room in association with each other. For example, in the network management table 950, the network segment of the room "Lecture Room A" is "192.168.30.0/24", the network segment of the room "Study Room" is "192.168.50.0/24", and the network segment of the room "Lecture Room B" is "192.168.70.0/24".

The room name included in the network management table 950 is an example of space information for identifying a space with a different network segment and is not limited to a room. When a room is divided into two or more spaces, the network segment may be set for each divided space in the room. The network management table 950 may set network segment for each building, floor, site, and the like. Furthermore, the space information may be a space ID (for example, a room ID) for identifying the space in addition to or instead of the room name.

Process and Operation of Third Embodiment Access Control Setting Process

Figure 27:
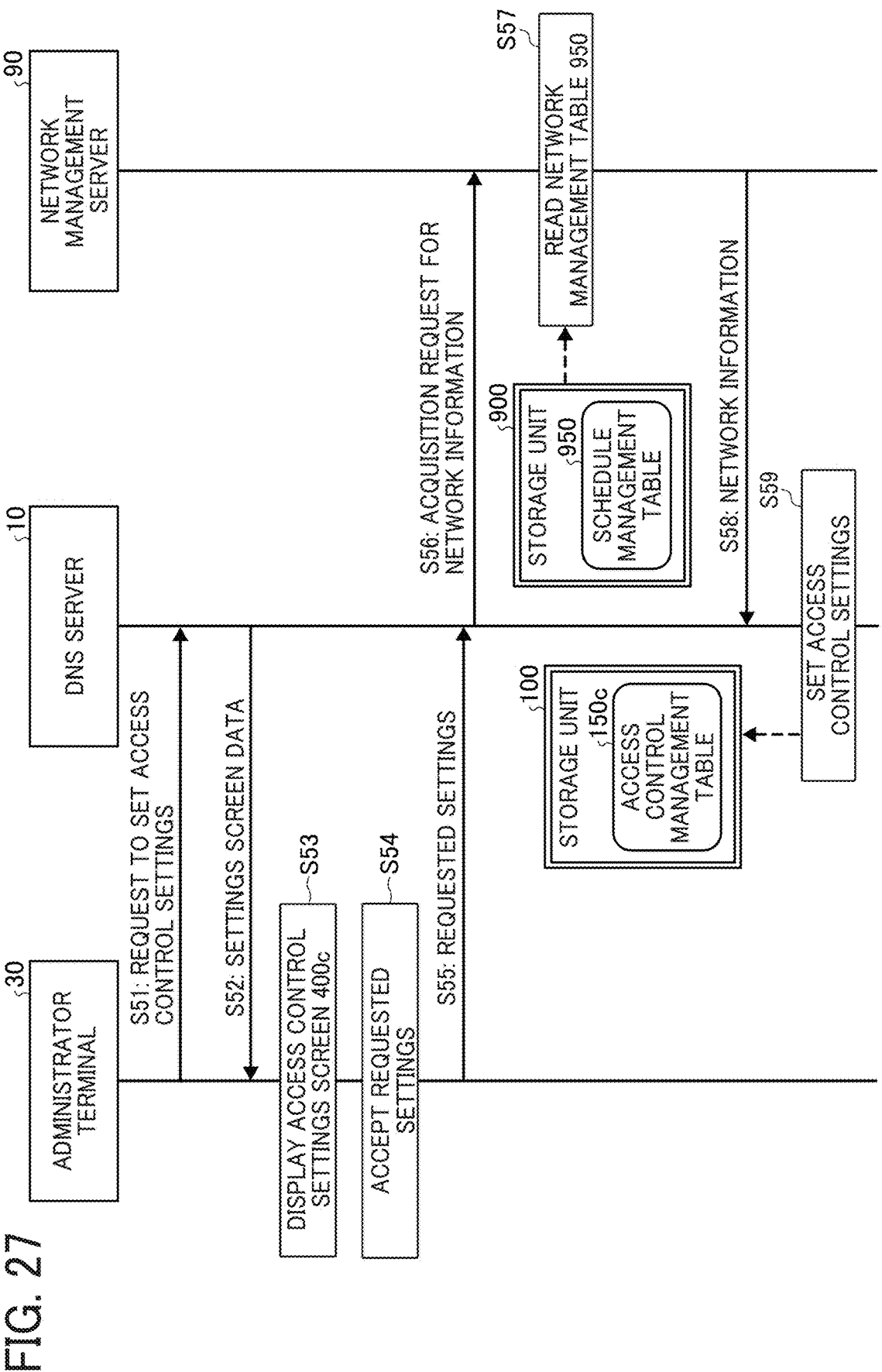
FIG. 27 is a sequence diagram illustrating an example of access control setting process according to the third embodiment of the present disclosure.

Hereinafter, processing and operation of the network system according to the third embodiment are described with reference to FIGS. 27 and 28. Note that the process of access (connecting) to the access target server 70 from the user terminal 50 is the same as the processes illustrated in FIGS. 10 to 12. FIG. 27 is a sequence diagram illustrating an example of access control setting process according to the third embodiment of the present disclosure.

In step S51, the transmission/reception unit 31 of the administrator terminal 30 issues a request to set access control settings to the DNS server 10 based on a user input operation on a screen displayed on the display 206a by the accepting unit 32. Thereby, the transmission/reception unit 11 of the DNS server 10 receives the request to set access control settings transmitted from the administrator terminal 30.

In step S52, when the transmission/reception unit 11 of the DNS server 10 receives the request to set access control settings, the transmission/reception unit 11 transmits settings screen data for inputting requested settings for setting access control settings to the administrator terminal 30. Thereby, the transmission/reception unit 31 of the administrator terminal 30 receives the settings screen data transmitted from the DNS server 10.

Figure 28:
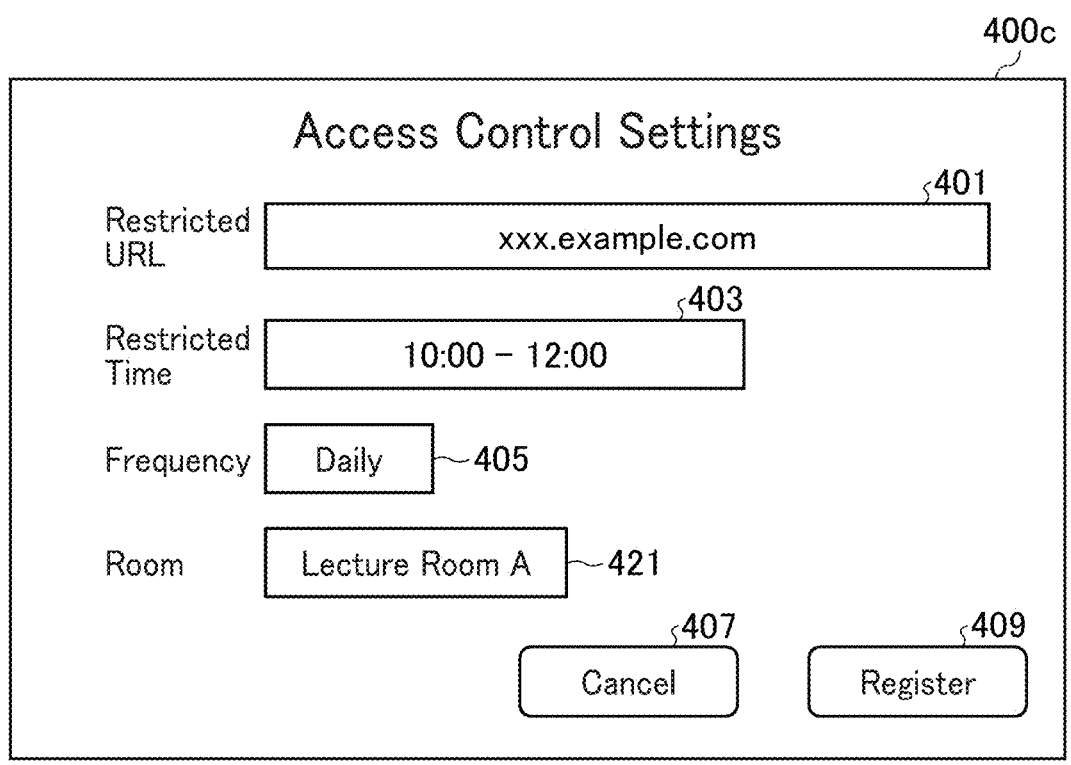
FIG. 28 is a diagram illustrating an example of an access control settings screen displayed on the administrator terminal according to the third embodiment of the present disclosure.

In step S53, when the settings screen data is received by the transmission/reception unit 31, the display control unit 33 of the administrator terminal 30 displays the access control settings screen 400c illustrated in FIG. 28 on the display 206a.

FIG. 28 is a diagram illustrating an example of the access control settings screen displayed on the administrator terminal according to the third embodiment of the present disclosure. The access control settings screen 400c illustrated in FIG. 28 includes restricted URL input area 401 for inputting a URL (restricted URL) for identifying an access target server 70 that the access from the user terminal 50 is to be restricted, a restricted time input area 403 for inputting a time for restricting (prohibiting) access to the restricted URL, a frequency input area 405 for inputting a frequency for restricting (prohibiting) access to the restricted URL, a room input area 421 for inputting a name of room for restricting (prohibiting) access, a cancel button 407 to be pressed when canceling the setting process, and a registration button 409 to be pressed when registering information input to each input area as access control settings. The access control settings screen 400c is an example of an input screen for requested settings for setting access control settings.

In step S54, the accepting unit 32 of the administrator terminal 30 accepts an input to each input area of the access control settings screen 400c. In the example illustrated in FIG. 28, the accepting unit 32 accepts the restricted URL "xxx.example.com", the restricted time "10:00-12:00", the frequency "daily", and the room "lecture room A". Here, the input information on the restricted time and the frequency of restriction becomes the restricted period. Note that the input to each input area of the access control settings screen 400c may be directly input by the administrator using an input device such as the keyboard 205, or candidates may be displayed in a pull-down format or the like to select an option.

In step S55, the transmission/reception unit 31 of the administrator terminal 30 transmits requested settings for access control settings for the access target server 70 to the DNS server 10. Specifically, the transmission/reception unit 31 transmits requested settings to the DNS server 10 when pressing of the registration button 409 included in the access control settings screen 400c displayed on the display 206a is accepted by the accepting unit 32. Here, the requested settings include the restricted URL, the restricted period that includes the restricted time and the frequency, and the name of the room input on the access control settings screen 400a. Thereby, the transmission/reception unit 11 of the DNS server 10 receives the requested settings transmitted from the administrator terminal 30.

In step S56, the transmission/reception unit 11 of the DNS server 10 transmits a network information acquisition request to the network management server 90 in response to receiving the requested settings transmitted from the administrator terminal 30. Here, the network information acquisition request includes the name of the room included in the requested settings. Accordingly, the transmission/reception unit 91 of the network management server 90 receives the network information acquisition request transmitted from the DNS server 10.

In step S57, the storage/reading unit 93 of the network management server 90 reads the network management table 950 stored in the storage unit 900. Specifically, the storage/reading unit 93 reads the network information included in the network management table 950 using the room name included in the network information acquisition request received by the transmission/reception unit 91 as a search key.

In step S58, the transmission/reception unit 91 of the network management server 90 transmits the network information read by the storage/reading unit 93 to the DNS server 10. Thereby, the transmission/reception unit 11 of the DNS server 10 receives the network information transmitted from the network management server 90.

In step S59, the setting unit 12 of the DNS server 10 sets access control settings for restricting (prohibiting) access (connection) to the access target server 70 from the user terminal 50 in response to receiving the network information by the transmission/reception unit 11. Specifically, the access control settings are set by the setting unit 12 storing the restricted URL included in the requested settings received in step S55 and the network segment included in the network information received in step S58 in the access control management table 150c stored in the storage unit 900. In the example of the access control settings screen 400c illustrated in FIG. 28, the setting unit 12 sets access setting information associated with "No. 1" included in the access control management table 150c illustrated in FIG. 25.

Effect of Third Embodiment

Since the network system 1c according to the third embodiment can set the access control settings for each network segment by linking the DNS server 10 and the network management server 90, the access control can be performed more flexibly. Further, the network system 1c can perform access control through the internet 7 of the user terminal 50 based on the access control settings set for each network segment by the DNS server 10, and the access control can be performed more flexibly.

Summary of Embodiments

As described above, the DNS server 10 (an example of a control apparatus) according to embodiments of the present disclosure controls access from the user terminal 50 (an example of a communication terminal) to the access target server 70. The DNS server 10 transmits to the administrator terminal 30, screen data which is the input screen for requested settings including a URL (an example of host information) for identifying the access target server 70 and the condition information indicating conditions for controlling access to the access target server 70 and receives the requested settings from the administrator terminal 30. Also, the DNS server 10 stores the access control settings in which the URL and the condition information are associated with each other based on the received requested settings. Then, the DNS server 10 receives an access request to the access target server 70 from the user terminal 50 and based on the scheduled access time indicated by the received access request and the condition indicated by the condition information associated with the URL for identifying the access target server 70, transmits a response to the access request to the user terminal 50. The access control settings based on the host information and the condition information can be frequently changed without the administrator frequently performing settings change operations on the DNS server 10, and the workload of the administrator can be reduced. Further, the network system 1a can restrict communication of the user terminal 50 through the internet based on conditions included in the access control settings set in the DNS server 10.

In the DNS server 10 (an example of a control apparatus) according to embodiments of the present disclosure, the condition information (an example of restricted period information) indicates a period during which access to the access target server 70 is restricted. When the scheduled access time indicated by the received access request is outside the period indicated by the restricted period associated with the URL (an example of host information), the DNS server 10 transmits an IP address (an example of first destination information) indicating a destination of an access target server 70 to the user terminal 50 (an example of a communication terminal) as a response to the access request and when the scheduled access time is within the time period indicated by the restricted period, the DNS server 10 transmits an IP address (an example of second destination information) different from the IP address indicating the destination of the access target server 70 to the user terminal 50 as a response to the access request. Thereby, the DNS server 10 can restrict communication through the internet of the user terminal 50 only for the restricted period in the access control settings stored in the DNS server 10.

Furthermore, in the DNS server 10 (an example of a control apparatus) according to embodiments of the present disclosure, the condition information is a condition (an example of permitted period) indicating a period during which access to the access target server 70 is permitted. When the scheduled access time indicated by the received access request is within the period indicated by the permitted period associated with the URL (an example of host information), the DNS server 10 transmits an IP address (an example of first destination information) indicating a destination of the access target server 70 to the user terminal 50

(an example of a communication terminal) as a response to the access request and when the scheduled access time is outside the time period indicated by the permitted period, the DNS server 10 transmits an IP address (an example of second destination information) different from the IP address indicating the destination of the access target server 70 to the user terminal 50 as a response to the access request. Thereby, the DNS server 10 can permit communication through the internet 7 of the user terminal 50 only for the permitted period in the access control settings stored in the DNS server 10.

In the DNS server 10 (an example of a control apparatus) according to embodiments of the present disclosure, the IP address (an example of second destination information) different from the IP address indicating the destination of the access target server 70 is the IP address indicating the destination of the DNS server 10. When the DNS server 10 receives an access request to the destination of the DNS server 10 from the user terminal 50 (an example of a communication terminal), the access prohibition screen data indicating that access to the access target server 70 is prohibited is transmitted to the user terminal 50. Thereby, the DNS server 10 can inform the user that access is restricted (prohibited).

Furthermore, the network system 1a according to embodiments of the present disclosure includes the DNS server 10 (an example of a control apparatus) and the administrator terminal 30. The administrator terminal 30 accepts input of requested settings from the input screen displayed on the display 206a (an example of a display unit) and transmits the accepted requested settings to the DNS server 10. In the network system 1a, the access control settings in the DNS server 10 can be added or changed at any time, by inputting the requested settings using the input screen displayed on the administrator terminal 30. As a result, a workload of the administrator can be reduced.

The network system 1b according to embodiments of the present disclosure includes the DNS server 10 (an example of a control apparatus) and the schedule management server 80 for storing the schedule name (an example of schedule identification information) for identifying a schedule and the scheduled period indicating a period in which the schedule is executed, associated with each other. In the network system 1b, the requested settings include the schedule name and the DNS server 10 transmits the schedule name included in the received requested settings to the schedule management server 80 and receives the scheduled period associated with the schedule name from the schedule management server 80. Then, the DNS server 10 stores the access control settings in which a URL (an example of host information) included in the received requested settings is associated with the received scheduled period. In the network system 1b, since the administrator using the administrator terminal 30 can set access control settings without directly inputting time information such as day of the week and time by linking the DNS server 10 and the schedule management server 80, it is possible to provide an intuitive setting operation with few input errors.

The network system 1c according to embodiments of the present disclosure includes the DNS server 10 (an example of a control apparatus) and the network management server 90 that stores the network information in which a room name (an example of space information) indicating a room (an example of a space) where the user terminal 50 (an example of a communication terminal) is located and a network segment indicating a network segment of the room, associated with each other. In the network system 1c, the requested settings include the room name, and the DNS server 10 transmits the schedule name included in the received requested settings to the network management server 90 and receives the network segment associated with the room name from the network management server 90. Then, the DNS server 10 stores access control settings in which the URL (an example of host information) and the condition information included in the received requested settings are associated with the received scheduled period. Therefore, since the network system 1c can set the access control settings for each network segment by linking the DNS server 10 and the network management server 90, the access control can be performed more flexibly. Since the network system 1c can perform access control through the internet 7 of the user terminal 50 using the access control settings set for each network segment by the DNS server 10, access control can be performed more flexibly.

Supplementary Information on Embodiments

The functions of each embodiment can be implemented by a computer executable program described in a legacy programming language such as assembler, C, C++, C#, Java (registered trademark) or an object oriented programming language, etc. Programs for performing the functions of each embodiment can be distributed through telecommunication lines.

The programs for executing the functions of the embodiments may be stored and distributed on equipment readable recording media such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc, an SD card, a magneto-optical (MO) disc, and the like.

In addition, some or all of the functions of the embodiments may be mounted on a programmable device (PD) such as a field programmable gate array (FPGA) or implemented as an application integrated circuit (ASIC), and distributed by the recording medium as a circuit configuration data (bit stream data) downloaded to the PD in order to implement the functions of the embodiments on the PD, or as data described by Hardware Description Language (HDL), Very High Speed Integrated Circuits Hardware Description Language (VHDL), Verilog-HDL, etc. for generating circuit configuration data.

Although the control apparatus, the network system, and the access control method according to embodiments of the present disclosure have been described above, the present disclosure is not limited to the above-described embodiments, and other embodiments such as additions, changes or deletions may be provided within the scope of those skilled in the art, and any mode is within the scope of the present disclosure as long as the action and effect of the present disclosure are exhibited.

Any one of the above-described operations may be performed in various other ways, for example, in an order different from the one described above.

What is claimed is:

1. A control apparatus for controlling access from a communication terminal to an access target server, the control apparatus comprising circuitry configured to:

transmit, to an administrator terminal, screen data for accepting input of requested settings including host information for identifying the access target server and condition information indicating conditions for controlling access to the access target server;

receive the requested settings from the administrator terminal;

store access control settings associating the host information and the condition information based on the received requested settings;

receive an access request to a particular access target server from the communication terminal;

determine whether the communication terminal is permitted to access the particular access target server based on the received access request and a condition indicated by condition information associated with host information for identifying the particular access target server;

transmit destination information indicating a destination of the particular access target server to the communication terminal in response to a determination that the communication terminal is permitted to access the particular access target server; and transmit a dummy IP address different from the destination information to the communication terminal in response to a determination that the communication terminal is not permitted to access the particular access target server, the dummy IP address being destination information that does not provide access to the particular access target server and that indicates the control apparatus;

transmit access prohibition screen data to the communication terminal in response to receiving the access request to the destination indicated by the dummy IP address from the communication terminal, the access prohibition screen data indicating prohibition of access to the particular access target server, wherein the control apparatus is a DNS server.

2. The control apparatus of claim 1, wherein the condition information indicates a period for restricting access to the access target server.

3. The control apparatus of claim 1, wherein the condition information indicates a period for permitting access to the access target server.

4. The control apparatus of claim 1, wherein the circuitry is further configured to determine whether the communication terminal is permitted to access the particular access target server additionally based on one of a time the access request transmitted from the communication terminal and a time the access request is received by the control apparatus.

5. An access control method performed by a DNS server, the method comprising:

transmitting, to an administrator terminal, screen data for accepting input of requested settings including host information for identifying an access target server and condition information indicating conditions for controlling access to the access target server;

receiving the requested settings from the administrator terminal;

storing, in a memory, access control settings associating the host information and the condition information based on the received requested settings;

receiving, from a communication terminal, an access request to a particular access target server;

determining whether the communication terminal is permitted to access the particular access target server based on the received access request and a condition indicated by condition information associated with the host information for identifying the particular access target server;

transmitting destination information indicating a destination of the particular access target server to the communication terminal in response to a determination that the communication terminal is permitted to access the particular access target server; and transmitting a dummy IP address different from the destination information to the communication terminal in response to a determination that the communication terminal is not permitted to access the particular access target server, the dummy IP address being destination information that does not provide access to the particular access target server and that indicates a control apparatus for controlling access from a communication terminal to the access target server; and transmitting access prohibition screen data to the communication terminal in response to receiving the access request to the destination indicated by the dummy IP address from the communication terminal, the access prohibition screen data indicating prohibition of access to the particular access target server.

6. A non-transitory recording medium storing a plurality of instructions which, when executed by one or more processors of a DNS server, causes the processors to perform an access control method comprising:

transmitting, to an administrator terminal, screen data for accepting input of requested settings including host information for identifying an access target server and condition information indicating conditions for controlling access to the access target server;

receiving the requested settings from the administrator terminal;

storing, in a memory, access control settings associating the host information and the condition information based on the received requested settings;

receiving, from a communication terminal, an access request to a particular access target server; and determining whether the communication terminal is permitted to access the particular access target server based on the received access request and a condition indicated by condition information associated with the host information for identifying the particular access target server;

transmitting destination information indicating a destination of the particular access target server to the communication terminal in response to a determination that the communication terminal is permitted to access the particular access target server; and transmitting a dummy IP address different from the destination information to the communication terminal in response to a determination that the communication terminal is not permitted to access the particular access target server, the dummy IP address being destination information that does not provide access to the particular access target server and that indicates a control apparatus for controlling access from a communication terminal to the access target server; and transmitting access prohibition screen data to the communication terminal in response to receiving the access request to the destination indicated by the dummy IP address from the communication terminal, the access prohibition screen data indicating prohibition of access to the particular access target server.

7. The control apparatus of claim 2, wherein
the condition information further indicates a network segment corresponding to a physical location.

8. The control apparatus of claim 3, wherein
the condition information further indicates a network segment corresponding to a physical location.

9. The access control method according to claim 5, wherein
the condition information indicates a period for restricting access to the access target server and a network segment corresponding to a physical location.

10. The access control method according to claim 5, wherein
the condition information indicates a period for permitting access to the access target server and a network segment corresponding to a physical location.

11. The non-transitory recording medium according to claim 6, wherein
the condition information indicates a period for restricting access to the access target server and a network segment corresponding to a physical location.

12. The non-transitory recording medium according to claim 6, wherein
the condition information indicates a period for permitting access to the access target server and a network segment corresponding to a physical location.

\* \* \* \* \*